US012576656B2

(12) United States Patent
Higashi et al.

(10) Patent No.: US 12,576,656 B2
(45) Date of Patent: Mar. 17, 2026

(54) AUXILIARY TAPE CASSETTE INCLUDING AUXILIARY TAPE, GEAR, AND CASE THAT ACCOMMODATES THEREIN AT LEAST A PART OF AUXILIARY TAPE AND AT LEAST A PART OF GEAR

(71) Applicant: BROTHER KOGYO KABUSHIKI KAISHA, Nagoya (JP)

(72) Inventors: Kosuke Higashi, Nagoya (JP); Kentaro Murayama, Kasugai (JP); Shinji Ukai, Kiyosu (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 89 days.

(21) Appl. No.: 18/187,221

(22) Filed: Mar. 21, 2023

(65) Prior Publication Data

US 2023/0219354 A1 Jul. 13, 2023

Related U.S. Application Data

(63) Continuation of application No. PCT/JP2021/034291, filed on Sep. 17, 2021.

(30) Foreign Application Priority Data

Sep. 30, 2020 (JP) ................................. 2020-164713

(51) Int. Cl.
*B41J 17/32* (2006.01)
*B41J 17/02* (2006.01)
*B41J 17/30* (2006.01)

(52) U.S. Cl.
CPC ............... *B41J 17/32* (2013.01); *B41J 17/02* (2013.01); *B41J 17/30* (2013.01)

(58) Field of Classification Search
CPC ... B41J 17/32; B41J 17/02; B41J 17/30; B41J 3/4075; B41J 32/00
See application file for complete search history.

(56) References Cited

U.S. PATENT DOCUMENTS

| | | | |
|---|---|---|---|
| 3,672,603 | A | 6/1972 | Swain |
| 3,804,227 | A | 4/1974 | Cappotto et al. |
| 3,823,808 | A | 7/1974 | Murata et al. |
| 3,948,382 | A | 4/1976 | Nesbitt et al. |

(Continued)

FOREIGN PATENT DOCUMENTS

| | | | |
|---|---|---|---|
| CN | 102092201 | A | 6/2011 |
| CN | 301959415 | S | 6/2012 |

(Continued)

OTHER PUBLICATIONS

International Search Report for PCT/JP2021/034291 dated Sep. 17, 2021.

(Continued)

*Primary Examiner* — Kristal Feggins
(74) *Attorney, Agent, or Firm* — Kenealy Vaidya LLP

(57) ABSTRACT

An auxiliary tape cassette includes: an auxiliary tape; a gear; and a case. The auxiliary tape is used for printing on a printing tape. The gear transmits a driving force from an outside. The case accommodates therein at least a part of the auxiliary tape and at least a part of the gear. The case has: a discharge opening; and a guide part. The discharge opening discharges the printing tape to an outside. The guide part guides the printing tape supplied from an outside of the case toward the discharge opening.

11 Claims, 13 Drawing Sheets

(56) References Cited

U.S. PATENT DOCUMENTS

| | | | |
|---|---|---|---|
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,619,244 | A | 4/1997 | Manna |
| 5,645,360 | A | 7/1997 | Iwane et al. |
| 5,917,532 | A | 6/1999 | Cornell et al. |
| 5,959,652 | A | 9/1999 | Privin |
| 6,511,238 | B1 | 1/2003 | Glize |
| 2007/0172286 | A1 | 7/2007 | Pomfret |
| 2008/0084494 | A1 | 4/2008 | Pomfret |
| 2010/0247208 | A1 | 9/2010 | Yamaguchi et al. |
| 2010/0247212 | A1 | 9/2010 | Yamaguchi et al. |
| 2011/0143073 | A1 | 6/2011 | Vandermeulen |
| 2017/0282622 | A1 | 10/2017 | Nishimura |
| 2020/0207107 | A1 | 7/2020 | Ishimoto et al. |
| 2022/0016915 | A1 | 1/2022 | Ishimoto et al. |
| 2022/0219472 | A1 | 7/2022 | Higashi et al. |
| 2023/0219357 | A1 | 7/2023 | Ukai et al. |
| 2023/0294431 | A1 | 9/2023 | Higashi et al. |
| 2023/0356537 | A1 | 11/2023 | Higashi et al. |

FOREIGN PATENT DOCUMENTS

| | | | |
|---|---|---|---|
| CN | 103273748 | A | 9/2013 |
| CN | 107264080 | A | 10/2017 |
| CN | 114502386 | A | 5/2022 |
| CN | 116194302 | A | 5/2023 |
| CN | 116234704 | A | 6/2023 |
| CN | 116802060 | A | 9/2023 |
| EP | 0414544 | A2 | 2/1991 |
| EP | 4023451 | A1 | 7/2022 |
| GB | 2016411 | A | 9/1979 |
| JP | S50-36734 | B1 | 11/1975 |
| JP | S54-111914 | A | 9/1979 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-038760 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | U | 7/1993 |
| JP | H06-183117 | A | 7/1994 |
| JP | H07-9745 | A | 1/1995 |
| JP | H07-32710 | A | 2/1995 |
| JP | 3015367 | U | 8/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | 2000-103149 | A | 4/2000 |
| JP | 2001-047713 | A | 2/2001 |
| JP | 2002-211092 | A | 7/2002 |
| JP | 2005-280060 | A | 10/2005 |
| JP | 2007-502221 | A | 2/2007 |
| JP | 2008-261968 | A | 10/2008 |
| JP | 2009-196804 | A | 9/2009 |
| JP | 2010-234772 | A | 10/2010 |
| JP | 2011-148167 | A | 8/2011 |
| JP | 2011-150007 | A | 8/2011 |
| JP | 2014-170142 | A | 9/2014 |
| JP | 2017177709 | A | 10/2017 |
| JP | 2020-104324 | A | 7/2020 |
| JP | 2020-104510 | A | 7/2020 |
| JP | 2020168723 | A | 10/2020 |
| WO | 2005/018944 | A1 | 3/2005 |

OTHER PUBLICATIONS

International Preliminary Report On Patentability and English language Written Opinion of the International Search Report for PCT/JP2021/034291 dated Mar. 28, 2023.

Extended European Search Report for European application No. 21875290.5 dated Jul. 8, 2024.

Japanese Office Action for Japanese Patent Application No. 2020-164713 dated Oct. 8, 2024.

AUXILIARY TAPE CASSETTE INCLUDING AUXILIARY TAPE, GEAR, AND CASE THAT ACCOMMODATES THEREIN AT LEAST A PART OF AUXILIARY TAPE AND AT LEAST A PART OF GEAR

REFERENCE TO RELATED APPLICATIONS

This is a by-pass continuation application of International Application No. PCT/JP2021/034291 filed Sep. 17, 2021 claiming priority from Japanese Patent Application No. 2020-164713 filed Sep. 30, 2020. The entire contents of the International Application and the priority application are incorporated herein by reference.

BACKGROUND ART

With a printing device that performs printing on a printing tape, cassettes that accommodates therein a printing tape are attached to and detached from a printing device body to replace and supply a printing tape. In one such cassette, a prior art discloses a configuration in which an ink ribbon and a printing tape are accommodated in a single case.

DESCRIPTION

Since the ink ribbon and the printing tape constitute a set in the cassette described above, combinations of colors of ink and types of the printing tape (e.g., color, size, material, etc.) are limited by the types of available cassettes.

In view of the foregoing, it is an object of the present disclosure to provide an auxiliary tape cassette that can arbitrarily combine any auxiliary tape and printing tape.

In order to attain the above and other object, the present disclosure provides an auxiliary tape cassette including: an auxiliary tape; a gear; and a case. The auxiliary tape is used for printing on a printing tape. The gear transmits a driving force from an outside. The case accommodates therein at least a part of the auxiliary tape and at least a part of the gear. The case has: a discharge opening; and a guide part. The discharge opening discharges the printing tape to an outside. The guide part guides the printing tape supplied from an outside of the case toward the discharge opening.

In the above structure, since the printing tape supplied from the outside of the case can be guided toward the discharge opening using the guide part, any printing tape can be supplied into the case. As a result, any auxiliary tape and printing tape can be combined arbitrarily. Further, the positioning accuracy of the gear relative to a printing device body can be improved by providing the case that accommodates therein at least a part of the auxiliary tape and at least a part of the gear.

1. First Embodiment

[1-1. Configuration]

Figure 1:
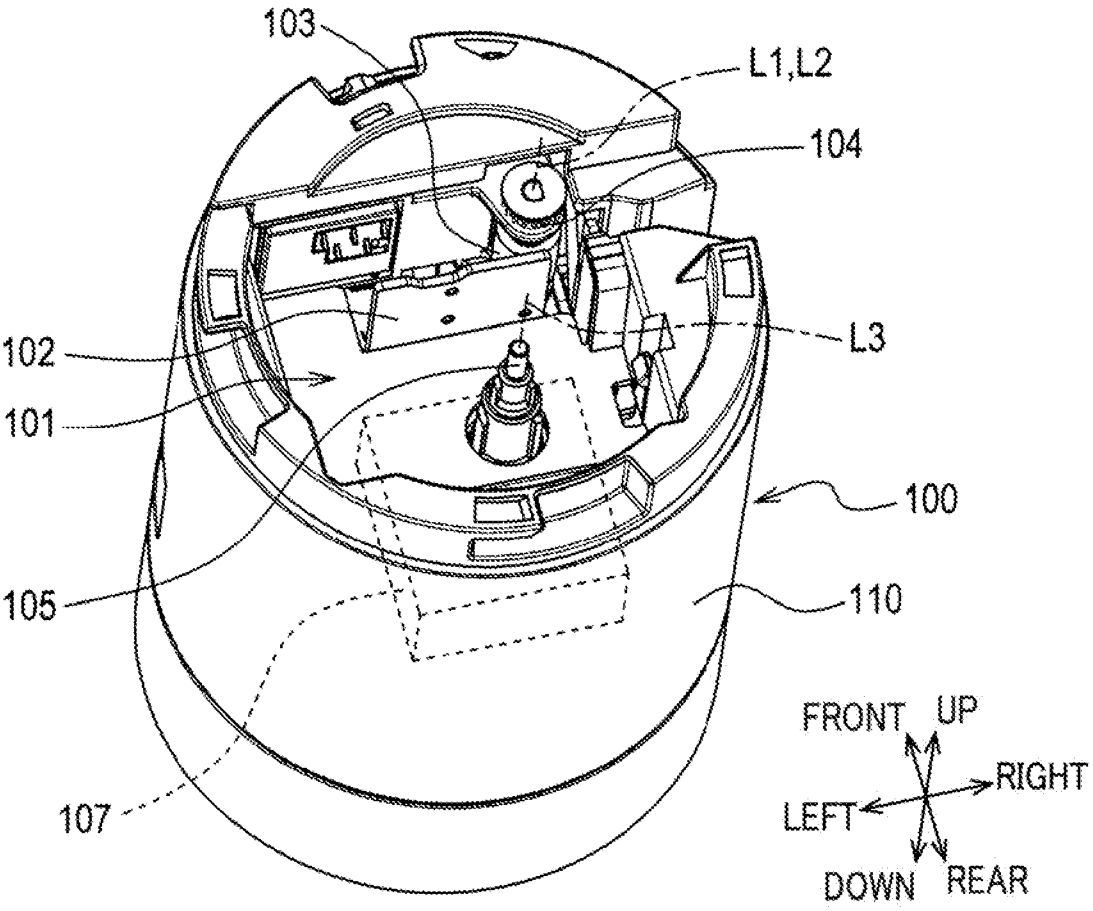
FIG. 1 is a schematic perspective view illustrating a printing device body.
Figure 2B:
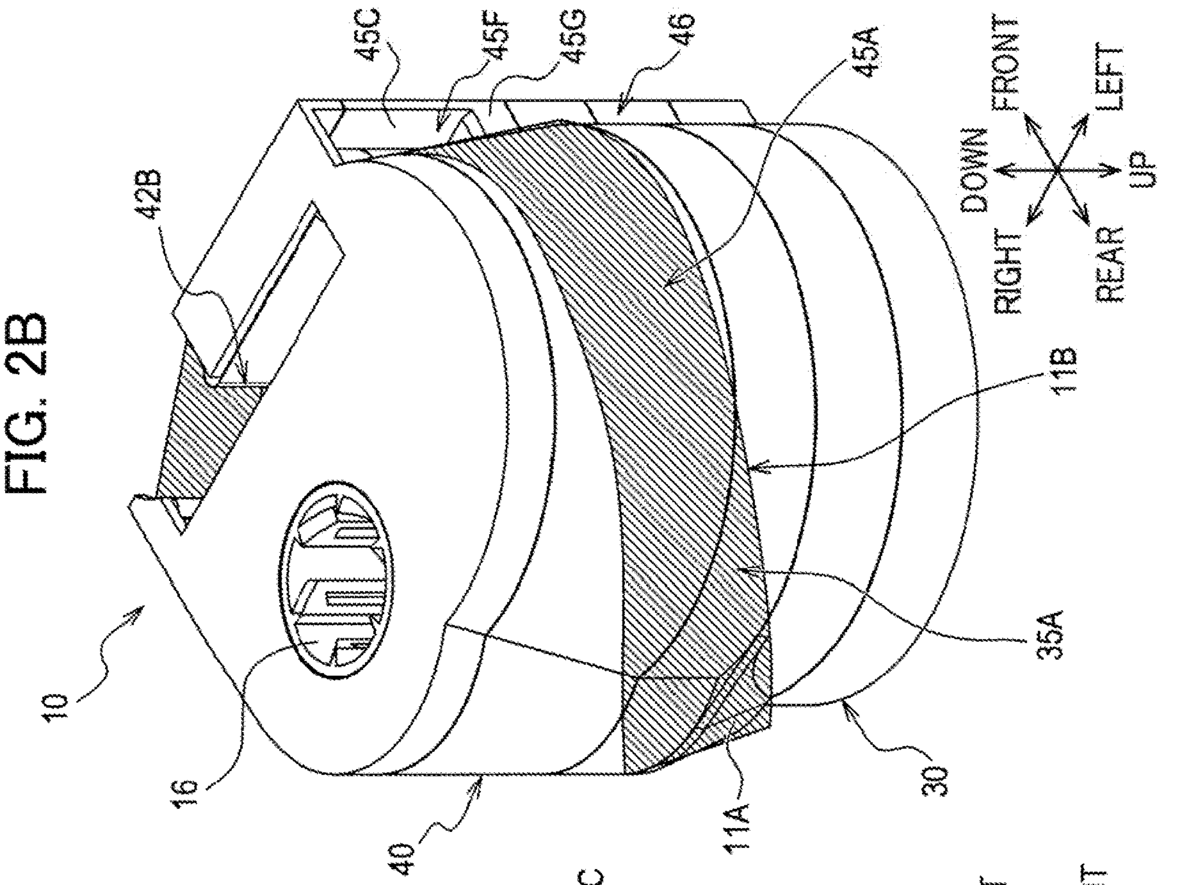
FIGS. 2A and 2B are schematic perspective views of a printing cassette.
Figure 2A:
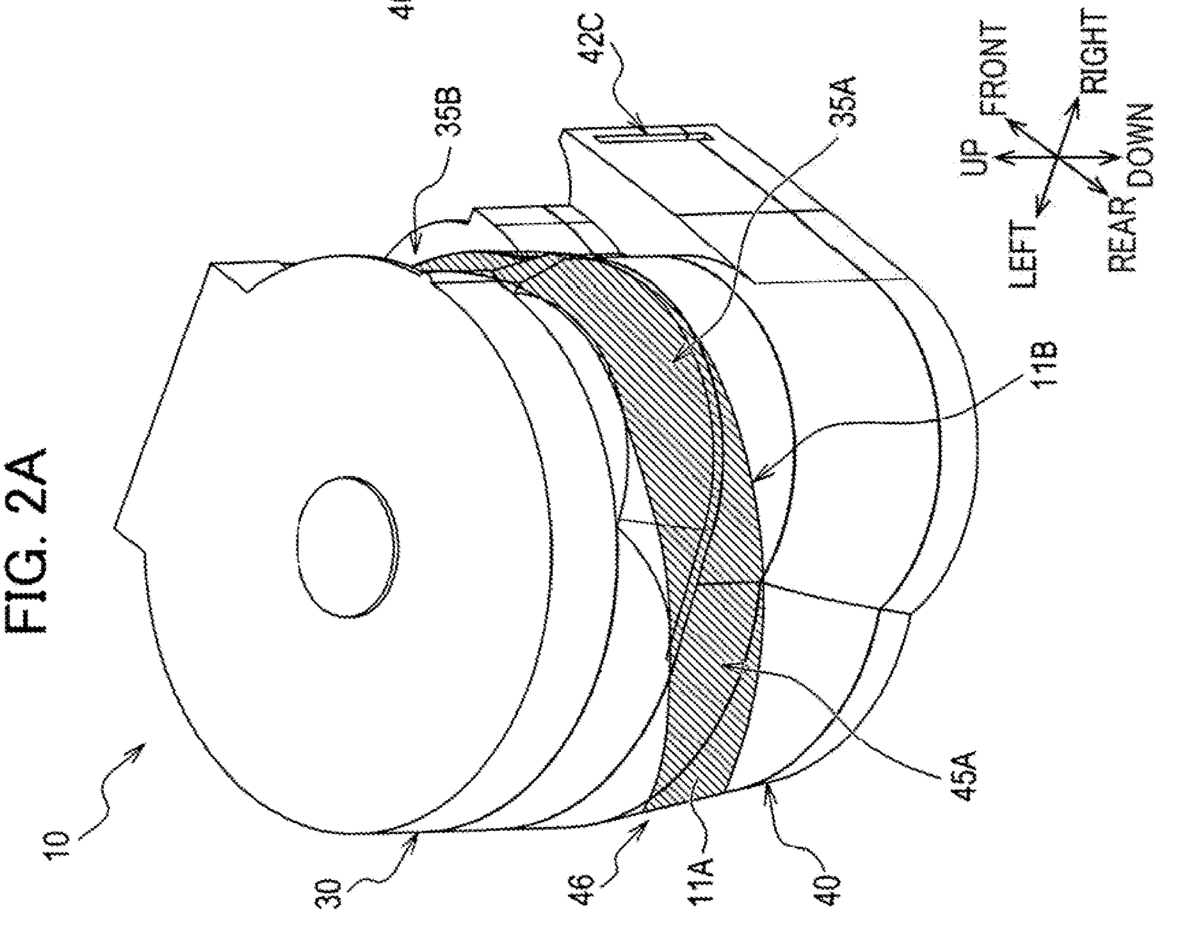

A printing device body 100 illustrated in FIG. 1 consists a printing device together with a printing cassette 10 illustrated in FIGS. 2A and 2B. This printing device is a device that performs printing on a tape-like printing medium.

In the present embodiment, an axial direction of an output gear 21 will be referred to as an up-down direction, a direction orthogonal to the up-down direction in which the output gear 21 and a take-up spool 16 are arranged will be referred to as a front-rear direction, and a direction orthogonal to both the up-down direction and the front-rear direction will be referred to as a left-right direction.

<Printing Device Body>

As illustrated in FIG. 1, the printing device body 100 includes a cassette accommodation part 101, a printing head 102, a platen roller 103, a platen gear 104, a drive shaft 105, a drive source 107, and a housing 110.

(Cassette Accommodation Part)

The cassette accommodation part 101 is a recess in which the printing cassette 10 is mounted. The cassette accommodation part 101 functions to position the printing cassette 10. The cassette accommodation part 101 is provided in the housing 110.

(Printing Head)

The printing head 102 is disposed inside the cassette accommodation part 101. The printing head 102 has a plurality of heating elements whose heat generation is individually controlled.

(Platen Roller)

The platen roller 103 is disposed inside the cassette accommodation part 101 near the printing head 102 so as to oppose the printing head 102. The platen roller 103 is pivotally movable in a direction toward or away from the printing head 102. A rotational axis L1 of the platen roller 103 is parallel to the up-down direction.

(Platen Gear)

The platen gear 104 is coupled to the platen roller 103. In the present embodiment, a rotational axis L2 of the platen gear 104 is arranged on the same line as the rotational axis L1 of the platen roller 103. The platen gear 104 is pivotally movable together with the platen roller 103.

(Drive Shaft)

The drive shaft 105 is inserted into the take-up spool 16 and an input gear 22 in the printing cassette 10. The drive shaft 105 rotates the take-up spool 16 and the input gear 22.

The drive shaft 105 is disposed inside the cassette accommodation part 101. A rotational axis L3 of the drive shaft 105 is parallel to the up-down direction. The drive shaft 105 is rotated about the rotational axis L3 by the drive source 107.

(Drive Source)

The drive source 107 drives the drive shaft 105 to rotate. A mechanism in which a motor and gears are combined, for example, can be used as the drive source 107.

<Printing Cassette>

The printing cassette 10 illustrated in FIGS. 2A and 2B includes a printing medium (i.e., a printing tape 11A). The printing cassette 10 is attachable to and detachable from the printing device body 100. By replacing the printing cassette 10, the printing medium can be replenished and the type of printing medium (e.g., the size, color, material, etc.) can be changed.

The printing cassette 10 includes a printing tape cassette 30, and an auxiliary tape cassette 40. The printing cassette 10 is attached to the printing device body 100 while the printing tape cassette 30 and the auxiliary tape cassette 40 are coupled to each other.

(Printing Tape Cassette)

Figure 3A:
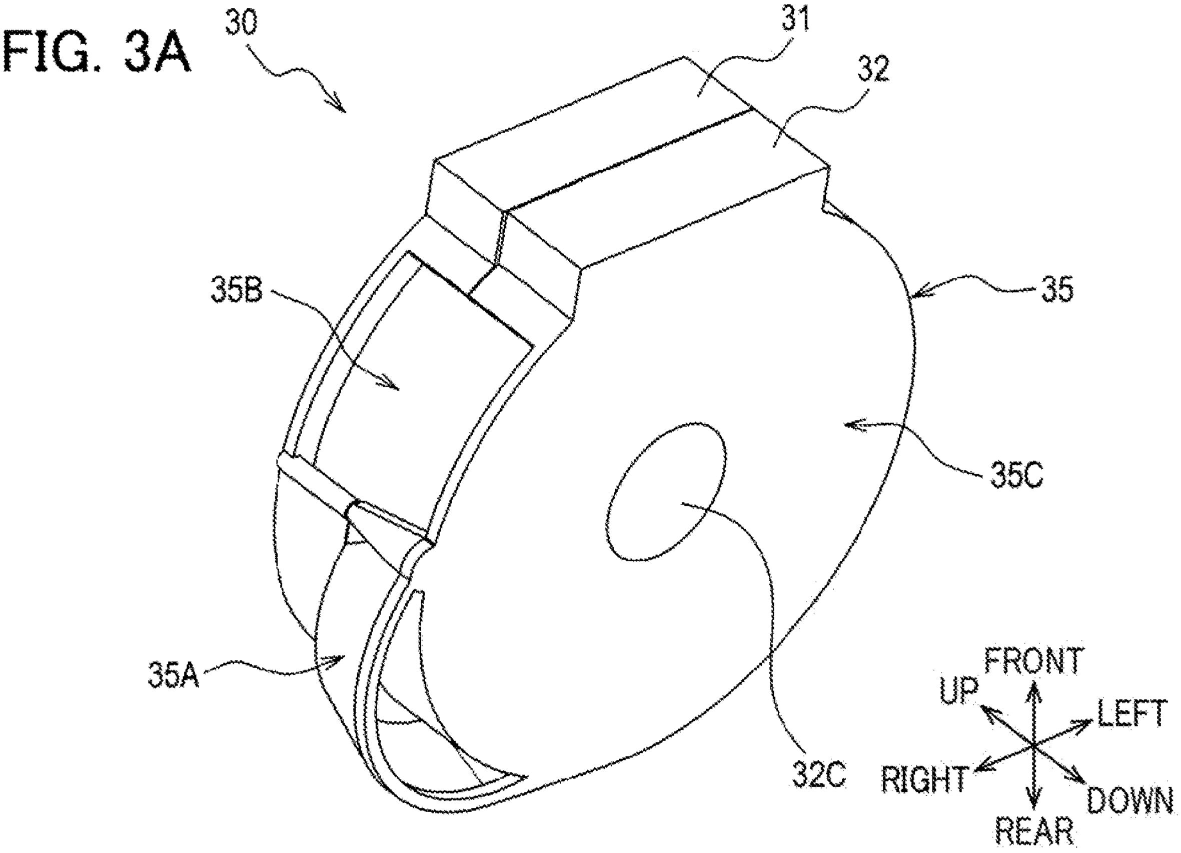
FIGS. 3A and 3B are schematic perspective views of a printing tape cassette of FIG. 2A.
Figure 3B:
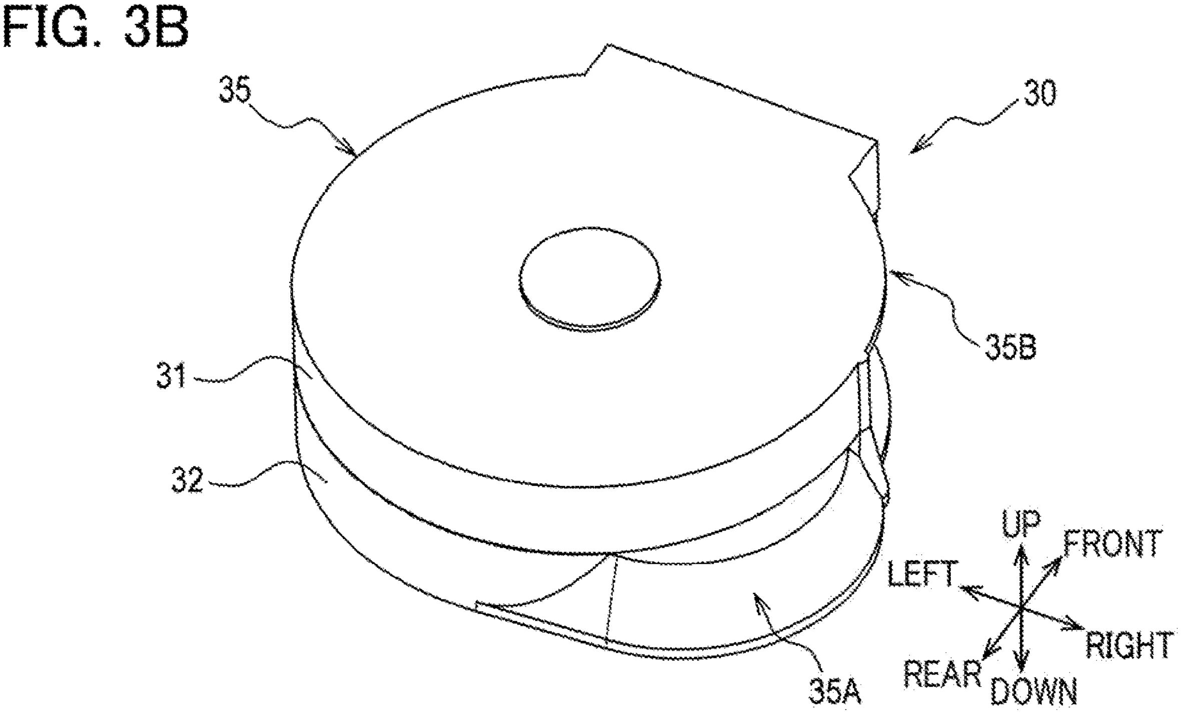
Figure 4:
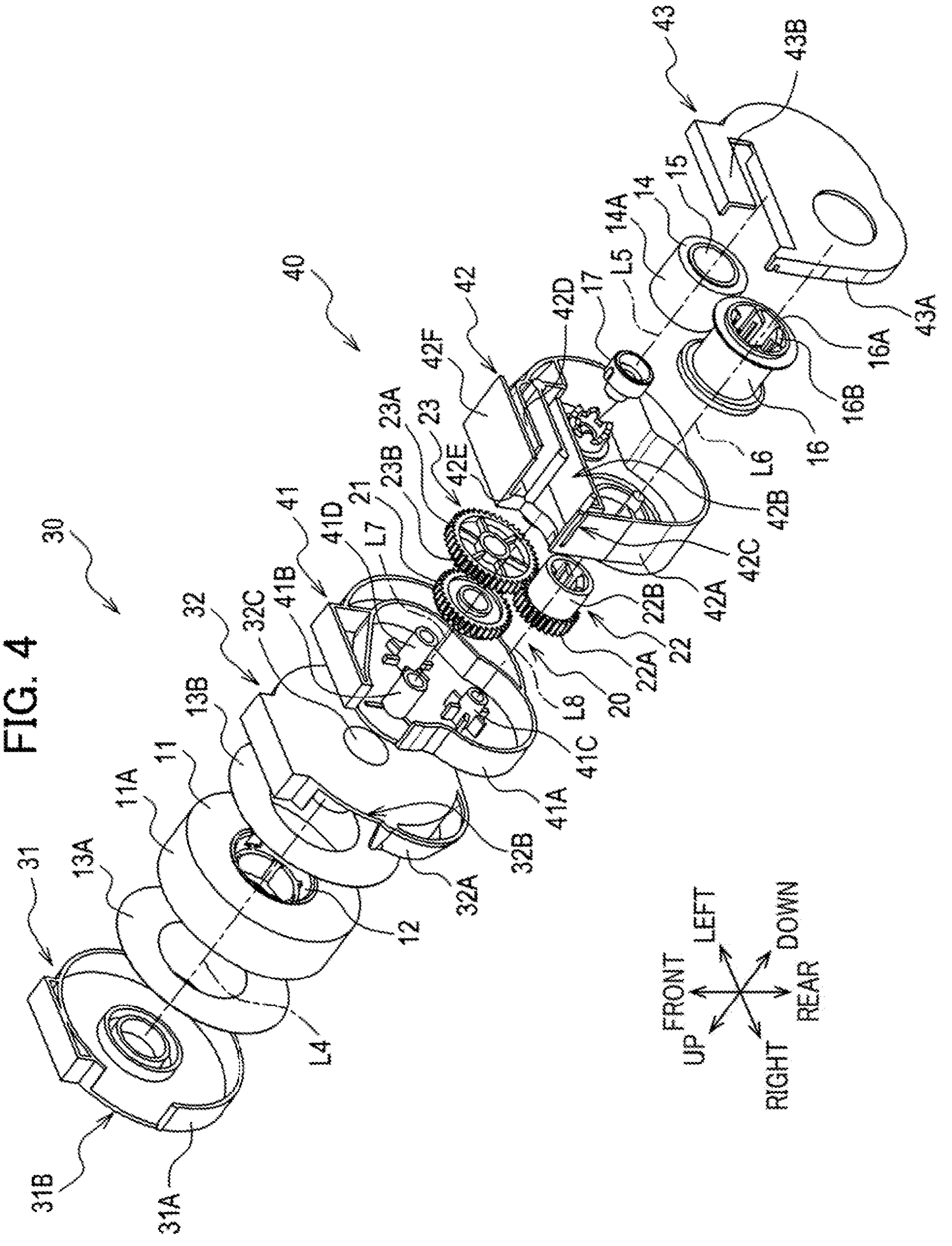
FIG. 4 is a schematic exploded perspective view of the printing cassette of FIG. 2A.

The printing tape cassette 30 illustrated in FIGS. 3A and 3B includes a printing tape case 35 that accommodates therein at least a part of the printing tape 11A. As illustrated in FIG. 4, the printing tape cassette 30 also includes a printing tape roll 11 (an example of the second roll), a first supply spool 12, and spacer films 13A and 13B.

(Printing Tape Roll)

The printing tape roll 11 is configured of the printing tape 11A subjected to printing wound around the first supply spool 12. Printing is performed on a surface of the printing tape 11A by the printing head 102 in the printing device body 100 and an ink ribbon 14A (an example of the auxiliary tape).

The two spacer films 13A and 13B are disposed on respective outer sides of the printing tape roll 11 in the up-down direction so as to interpose the printing tape roll 11 therebetween. The spacer films 13A and 13B are disposed between the printing tape roll 11 and a first case part 31 and between the printing tape roll 11 and a second case part 32, respectively.

(First Supply Spool)

The first supply spool 12 is rotatable about a rotational axis L4. The first supply spool 12 supplies the printing tape 11A to the printing head 102 by rotating in accordance with conveyance of the printing tape 11A by the platen roller 103 of the printing device body 100. The rotational axis L4 of the first supply spool 12 is parallel to the up-down direction and is coincident with a winding axis of the printing tape roll 11.

(Printing Tape Case)

The printing tape case 35 has the first case part 31, the second case part 32, a first guide surface 35A (see FIGS. 3A and 3B), and a first discharge opening 35B (see FIGS. 3A and 3B).

The first case part 31 constitutes an upper end portion of the printing tape case 35. The second case part 32 constitutes a lower end portion of the printing tape case 35. The second case part 32 is disposed below the first case part 31 and is coupled to the first case part 31 in the up-down direction. The printing tape roll 11 is disposed in a space enclosed by the first case part 31 and the second case part 32.

The first case part 31 has a first side wall 31A, and a first notch 31B. The second case part 32 has a second side wall 32A, a second notch 32B, and a first positioning part 32C.

Among outer surfaces of the printing tape case 35, the first side wall 31A and the second side wall 32A constitute a side surface that circumferentially surrounds the printing tape roll 11. The first notch 31B is provided in a front portion of the first side wall 31A. The second notch 32B is provided in a front portion of the second side wall 32A. The first notch 31B and the second notch 32B are coupled together to constitute the first discharge opening 35B for the printing tape 11A.

As illustrated in FIGS. 2A and 2B, a part of the side surface of the printing tape case 35 constitutes the first guide surface 35A, which guides the printing tape 11A that has been discharged through the first discharge opening 35B of the printing tape case 35.

The first discharge opening 35B is provided in the side surface of the printing tape case 35 for discharging the printing tape 11A out of the printing tape case 35. The printing tape 11A that has been discharged through the first discharge opening 35B in a radial direction of the printing tape roll 11 is conveyed downward from the first discharge opening 35B (i.e., toward the auxiliary tape cassette 40) while being wound around the first guide surface 35A in a spiral shape having a central axis that is parallel to the up-down direction.

As illustrated in FIG. 3A, the first positioning part 32C is a hole provided in a first coupling surface 35C of the printing tape case 35. The first coupling surface 35C is a surface that opposes and contacts the auxiliary tape cassette 40 positioned below the printing tape case 35 when the printing tape case 35 has been inserted into the cassette accommodation part 101. The first positioning part 32C positions the printing tape case 35 relative to the auxiliary tape cassette 40. A second positioning part 41E on the auxiliary tape cassette 40 is inserted into the first positioning part 32C.

Among the outer surfaces of the printing tape case 35, the first coupling surface 35C is a flat surface that crosses (specifically, that is orthogonal to) the up-down direction. The auxiliary tape cassette 40 can be arranged on the first coupling surface 35C.

(Auxiliary Tape Cassette)

Figure 5A:
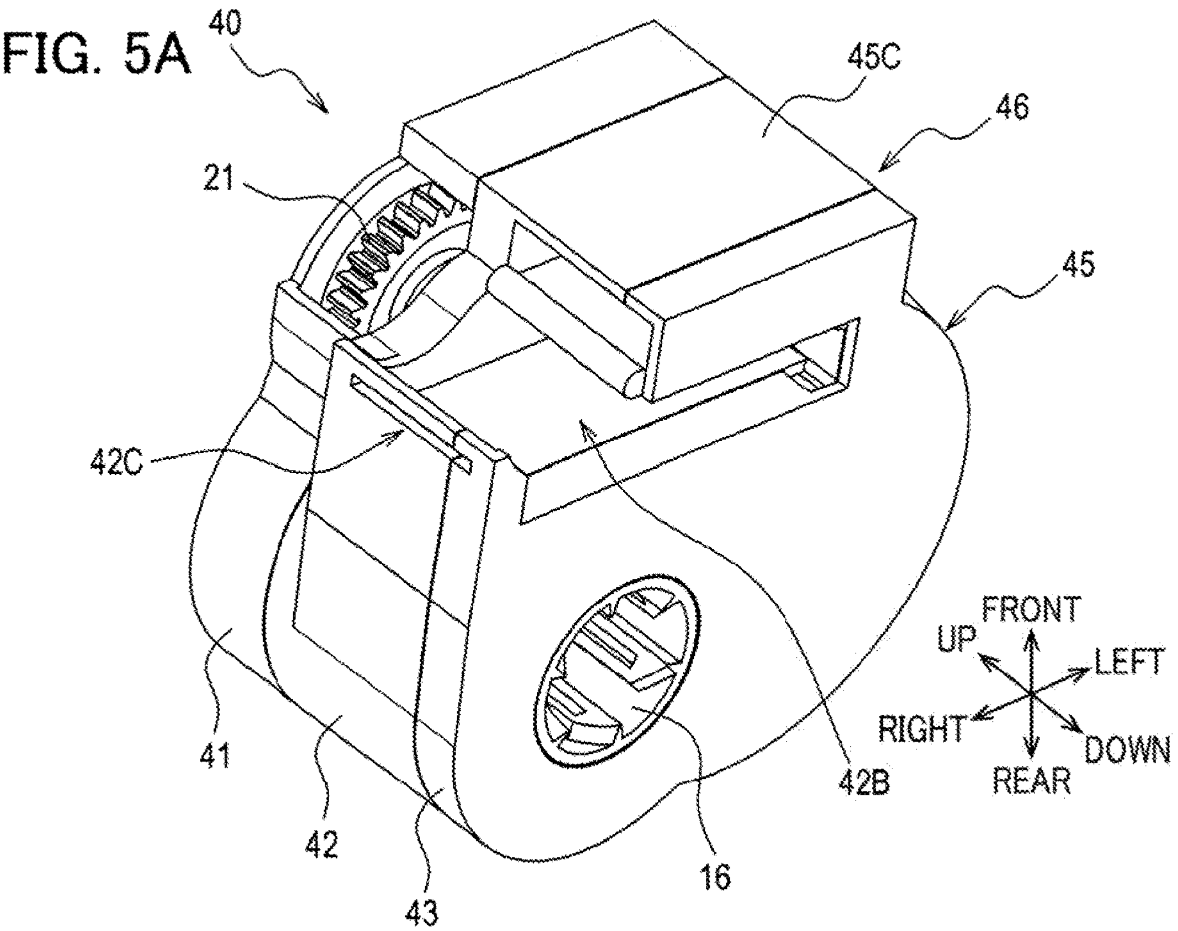
FIGS. 5A and 5B are schematic perspective views of an auxiliary tape cassette of FIG. 2A.
Figure 5B:
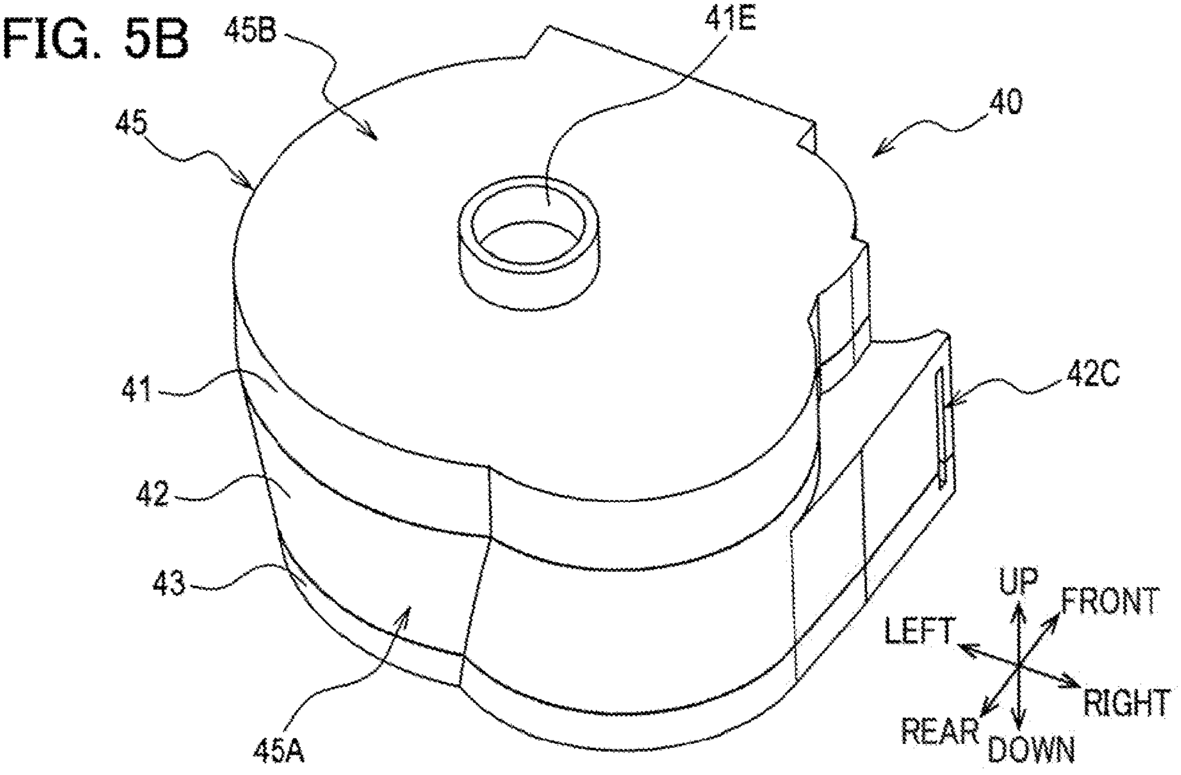

The auxiliary tape cassette 40 illustrated in FIGS. 5A and 5B is attachable to and detachable from the printing tape cassette 30. The auxiliary tape cassette 40 includes an auxiliary tape case 45 (an example of the case) that accommodates therein at least a part of the ink ribbon 14A and at least a part of a drive transmission unit 20.

The auxiliary tape cassette 40 in the present embodiment also serves as a gear cassette that accommodates therein gears. As illustrated in FIG. 4, the auxiliary tape cassette 40 includes an ink ribbon roll 14 (an example of the first roll and the auxiliary tape roll), a second supply spool 15, the take-up spool 16, a clutch spring holder 17, and the drive transmission unit 20.

(Ink Ribbon Roll)

The ink ribbon roll 14 is configured of the ink ribbon 14A wound around the second supply spool 15. The ink ribbon 14A is used for printing on the printing tape 11A.

The ink ribbon 14A is superimposed on the printing tape 11A being conveyed at a head opening 42B (an example of the exposure opening) and is used for printing by the printing head 102. The ink ribbon 14A that has been used for printing is taken up by the take-up spool 16.

Rotational resistance is applied to the ink ribbon roll 14 by a clutch spring (not illustrated) held in the clutch spring holder 17. At least a part of the ink ribbon roll 14 is disposed in a position that is overlapped with the printing tape roll 11 in the up-down direction.

(Second Supply Spool)

The second supply spool 15 is rotatable about a rotational axis L5. The rotational axis L5 of the second supply spool 15 is parallel to the rotational axis L4 of the first supply spool 12, i.e., is parallel to the up-down direction, and is coincident with a winding axis of the ink ribbon roll 14. The second supply spool 15 supplies the ink ribbon 14A to the head opening 42B by rotating as the take-up spool 16 takes up the ink ribbon 14A.

(Take-up Spool)

The take-up spool 16 is rotatable about a rotational axis L6. The rotational axis L6 of the take-up spool 16 is parallel to the rotational axis L5 of the second supply spool 15.

The take-up spool 16 is a cylindrical part that has a hollow part defined by an inner circumferential surface 16A. Splines 16B are provided on the inner circumferential surface 16A of the take-up spool 16. The drive shaft 105 of the printing device body 100 is coupled to the splines 16B. The take-up spool 16 is rotated by the drive shaft 105 to take up the ink ribbon 14A that has been used for printing.

(Drive Transmission Unit)

When a printing cassette 10 has been attached to the printing device body 100, the drive transmission unit 20 transmits a driving force of the drive source 107 transmitted through the drive shaft 105 to the platen roller 103 and rotates the platen roller 103 at a rotational speed set for the respective printing cassettes 10.

The drive transmission unit 20 includes the output gear 21, the input gear 22, and an idle gear 23. The drive transmission unit 20 is disposed further upward than the ink ribbon roll 14 (i.e., near the printing tape cassette 30). In other words, the output gear 21 and the input gear 22 are arranged in the auxiliary tape case 45 to be spaced apart from the ink ribbon roll 14 in the up-down direction.

(Output Gear)

The output gear 21 is an external gear provided for outputting a driving force used for conveying the printing tape 11A to an outside. Specifically, the output gear 21 transmits the driving force from an outside to the platen gear 104 of the printing device body 100. A rotational axis L7 of the output gear 21 is parallel to the rotational axis L5 of the second supply spool 15. A part of the output gear 21 is exposed to a space that communicates with the head opening 42B.

The output gear 21 engages with the platen gear 104 at the space communicating with the head opening 42B while the printing cassette 10 is attached to the printing device body 100 (i.e., while the auxiliary tape case 45 is accommodated in the cassette accommodation part 101).

(Input Gear)

The input gear 22 indirectly engages with the output gear 21 via the idle gear 23 and transmits a driving force to the output gear 21.

The input gear 22 has an external gear 22A, and a spool 22B. The spool 22B is fixed to one side surface of the external gear 22A. The spool 22B is a cylindrical internal gear with splines provided on an inner circumferential surface thereof. The external gear 22A is rotated integrally with the spool 22B by the driving force of the drive source 107 inputted into the spool 22B.

A rotational axis L8 of the input gear 22 (i.e., a rotational axis of the external gear 22A and a rotational axis of the spool 22B) is arranged on the same line as the rotational axis L6 of the take-up spool 16. At least a part of the input gear 22 is disposed at a position overlapped with the printing tape roll 11 in the up-down direction.

The rotational axis L8 of the input gear 22 is overlapped with the hollow part of the take-up spool 16 in the up-down direction. Also, a lower end portion of the spool 22B in the input gear 22 is inserted into the hollow part of the take-up spool 16 from above.

Therefore, the drive shaft 105 is simultaneously inserted into the take-up spool 16 and the input gear 22 in a state where the printing cassette 10 is attached to the printing device body 100. As a result, the input gear 22, although not directly coupled to the take-up spool 16, is rotated together with the take-up spool 16 by the drive shaft 105.

(Idle Gear)

The idle gear 23 is drivingly coupled to (i.e., engages with) the input gear 22 and the output gear 21, and transmits a driving force inputted into the input gear 22 to the output gear 21. Hence, the drive shaft 105 inputs a driving force into the output gear 21 indirectly via the input gear 22 and the idle gear 23.

The idle gear 23 is a stepped gear having an upstream gear 23A engaging with the input gear 22, and a downstream gear 23B engaging with the output gear 21. The upstream gear 23A and the downstream gear 23B are coaxially juxtaposed with each other. The downstream gear 23B has a diameter smaller than the upstream gear 23A. Further, the downstream gear 23B is arranged closer to the printing tape cassette 30 than the upstream gear 23A is to the printing tape cassette 30 in the up-down direction (i.e., above the downstream gear 23B).

The idle gear 23 transmits the driving force inputted into the input gear 22 to the output gear 21 after reducing a rotational speed of the driving force. That is, the drive transmission unit 20 includes a reduction mechanism whose reduction ratio is a transmission ratio obtained by dividing a rotational speed of the input gear 22 by a rotational speed of the output gear 21.

(Auxiliary Tape Case)

The auxiliary tape case 45 has a third case part 41, a fourth case part 42, a fifth case part 43, and a guide part 46 (see FIG. 5A).

The third case part 41 constitutes an upper end portion of the auxiliary tape case 45. The fifth case part 43 constitutes a lower end portion of the auxiliary tape case 45. The fourth case part 42 is arranged below the third case part 41 and above the fifth case part 43, and is coupled to the third case part 41 and the fifth case part 43 in the up-down direction.

The ink ribbon roll 14, the second supply spool 15, and the take-up spool 16 are disposed in a space enclosed by the fourth case part 42 and the fifth case part 43. A part of the output gear 21, the input gear 22, and the idle gear 23 are disposed in a space enclosed by the third case part 41 and the fourth case part 42.

The third case part 41 has a third side wall 41A, a first gear support part 41B, a second gear support part 41C, a third gear support part 41D, and the second positioning part 41E (see FIG. 5B). Among outer surfaces of the auxiliary tape case 45, the third side wall 41A constitutes a side surface, which is continuous with the side surface of the printing tape case 35.

The first gear support part 41B supports the output gear 21 such that the output gear 21 is rotatable. The second gear support part 41C supports the input gear 22 such that the input gear 22 is rotatable. The third gear support part 41D supports the idle gear 23 such that the idle gear 23 is rotatable.

The second positioning part 41E illustrated in FIG. 5B is provided on a second coupling surface 45B. The second coupling surface 45B opposes and contacts the printing tape cassette 30 positioned above the second coupling surface 45B while the auxiliary tape case 45 is inserted in the cassette accommodation part 101.

Among the outer surfaces of the auxiliary tape case 45, the second coupling surface 45B is a flat surface that crosses (specifically, that is orthogonal to) the up-down direction and that is parallel to the first coupling surface 35C of the printing tape case 35. The printing tape cassette 30 can be arranged on the second coupling surface 45B.

The second positioning part 41E is a cylindrical or columnar part that protrudes upward from the second coupling surface 45B. When the auxiliary tape cassette 40 and the printing tape cassette 30 are coupled together, the auxiliary tape cassette 40 is positioned relative to the printing tape cassette 30 in the front-rear direction and the left-right direction by the second positioning part 41E being inserted into the first positioning part 32C of the printing tape case 35.

The fourth case part 42 illustrated in FIG. 4 has a fourth side wall 42A, the head opening 42B, a second discharge opening 42C (an example of the discharge opening), an inner guide wall 42D, a first restricting part 42E, and a ceiling wall 42F. Among the outer surfaces of the auxiliary tape case 45, the fourth side wall 42A constitutes a side surface that circumferentially surrounds the ink ribbon roll 14.

The head opening 42B is a cutout formed in a part of the fourth side wall 42A. The head opening 42B is a space in which the printing head 102 is placed in a state where the printing cassette 10 is attached to the printing device body 100.

In the head opening 42B, printing is performed on the printing tape 11A by the printing head 102. The head opening 42B is open in a lower portion of the auxiliary tape cassette 40 so that the printing head 102 can be inserted thereinto from below.

The printing tape 11A and the ink ribbon 14A are passed over the head opening 42B in the left-right direction. The printing tape 11A is exposed in the head opening 42B at a position upstream relative to the second discharge opening 42C in a discharging direction of the printing tape 11A.

The second discharge opening 42C discharges the printing tape 11A on which printing has been performed to an outside of the printing cassette 10. That is, the second discharge opening 42C discharges the printing tape 11A from an inside of the auxiliary tape case 45 to the outside therethrough. The printed printing tape 11A is discharged to an outside of the printing device through the second discharge opening 42C.

The inner guide wall 42D is a plate-like part having a front surface that guides the printing tape 11A (i.e., contacts the printing tape 11A from the rear) along the left-right direction inside the auxiliary tape case 45. The inner guide wall 42D constitutes a part of a second guide surface 45A that guides the printing tape 11A toward the second discharge opening 42C.

The inner guide wall 42D is continuously provided from the fourth side wall 42A. Additionally, the inner guide wall 42D is disposed upstream of the head opening 42B in the discharging direction of the printing tape 11A and further frontward than the head opening 42B.

At least a part of the inner guide wall 42D is disposed at the same position as the second discharge opening 42C in the up-down direction. That is, at least a part of the inner guide wall 42D is overlapped with the second discharge opening 42C in a direction orthogonal to the up-down direction. The printing tape 11A is conveyed on the inner guide wall 42D in a direction orthogonal to the up-down direction (specifically, in the left-right direction).

The first restricting part 42E restricts movement of the printing tape 11A in a width direction thereof when the printing tape 11A is conveyed along the second guide surface 45A configured by the inner guide wall 42D. Specifically, the first restricting part 42E is disposed above the inner guide wall 42D and has a lower surface that is orthogonal to the up-down direction.

The ceiling wall 42F is disposed frontward of the inner guide wall 42D to be spaced apart from the inner guide wall 42D. The ceiling wall 42F and the inner guide wall 42D constitute therebetween a conveying path for the printing tape 11A. The ceiling wall 42F is connected to the first restricting part 42E. An inner surface (i.e., a rear surface) of the ceiling wall 42F constitutes a restricting surface that is arranged to oppose the inner guide wall 42D.

The fifth case part 43 has a fifth side wall 43A, and a second restricting part 43B. Together with the fourth side wall 42A of the fourth case part 42, the fifth side wall 43A constitutes the side surface of the auxiliary tape case 45 that circumferentially surrounds the ink ribbon roll 14.

The second restricting part 43B restricts movement of the printing tape 11A in the width direction thereof in cooperation with the first restricting part 42E when the printing tape 11A is conveyed along the second guide surface 45A. Specifically, the second restricting part 43B is disposed below the inner guide wall 42D of the fourth case part 42 and has an upper surface that is orthogonal to the up-down direction. The second restricting part 43B opposes the first restricting part 42E of the fourth case part 42 in the up-down direction.

The inner guide wall 42D, the ceiling wall 42F, the first restricting part 42E, and the second restricting part 43B configure an arm part 45C, as illustrated in FIG. 2B. The arm part 45C has a space through which the printing tape 11A passes when the printing tape 11A is conveyed along the second guide surface 45A of the auxiliary tape case 45.

The arm part 45C constitutes a tunnel-like part that encompasses the printing tape 11A in the width direction and a thickness direction thereof. An entrance for the printing tape 11A in the arm part 45C constitutes an insertion opening 45F through which the printing tape 11A supplied from the printing tape cassette 30 is inserted to the inside of the auxiliary tape case 45.

Within the arm part 45C, the inner guide wall 42D and the ceiling wall 42F restrict movement of the printing tape 11A in the front-rear direction (i.e., the thickness direction) and the first restricting part 42E and the second restricting part 43B restrict movement of the printing tape 11A in the up-down direction (i.e., the width direction). The printing tape 11A that has passed through the arm part 45C is supplied to the head opening 42B.

As illustrated in FIGS. 2A and 2B, a part of the side surface of the auxiliary tape case 45 constitutes the second guide surface 45A, which guides the printing tape 11A supplied from an outside of the auxiliary tape case 45 (i.e., from the printing tape cassette 30) toward the second discharge opening 42C. The printing tape 11A guided by the first guide surface 35A of the printing tape case 35 is further guided toward the second discharge opening 42C by the second guide surface 45A.

The guide part 46 guides the printing tape 11A supplied from the outside of the auxiliary tape case 45 toward the second discharge opening 42C. The guide part 46 has the second guide surface 45A, and the insertion opening 45F.

The insertion opening 45F is provided in an insertion side surface 45G (an example of the side surface) of the auxiliary tape case 45. Among the outer surfaces of the auxiliary tape case 45, the insertion side surface 45G is a surface that crosses the left-right direction (specifically, is parallel to the up-down direction) and that is arranged at a position that is not overlapped with the ink ribbon roll 14 in the up-down direction (specifically, arranged frontward of the ink ribbon roll 14). The printing tape 11A is inserted rightward through the insertion opening 45F.

<Conveyance and Printing of Printing Tape with Printing Device Body>

When the printing cassette 10 is attached to the printing device body 100, the printing tape 11A is wrapped around the first guide surface 35A of the printing tape case 35 and the second guide surface 45A of the auxiliary tape case 45 to form a spiral portion 11B.

The spiral portion 11B of the conveyed printing tape 11A is wrapped across the side surface of the printing tape case 35 and the side surface of the auxiliary tape case 45. Specifically, the spiral portion 11B extends from the first discharge opening 35B of the printing tape case 35 to the insertion opening 45F.

When the printing cassette 10 is attached to the printing device body 100 with the printing tape 11A wrapped around the guide surfaces in this way, the printing head 102 is arranged in the head opening 42B at a position overlapped with the printing tape 11A and the ink ribbon 14A in the front-rear direction.

The printing tape 11A is conveyed to the head opening 42B by the platen roller 103 and is pressed against the printing head 102 through the ink ribbon 14A by the platen roller 103 while the heating elements of the printing head 102 generate heat. As a result, some ink provided on a surface of the ink ribbon 14A is transferred onto the printing tape 11A, whereby characters, symbols, and the like are printed on the printing tape 11A.

The platen roller 103 conveys the printed printing tape 11A from an inside of the printing cassette 10 toward the outside of the printing cassette 10. The platen roller 103 is rotated by the platen gear 104, which is engaged with the output gear 21. The platen roller 103 and the platen gear 104 is pivotally movable between a position in which the platen roller 103 and the platen gear 104 are separated from the printing cassette 10 and a position in which the platen gear 104 is engaged with the output gear 21.

While the auxiliary tape case 45 of the printing cassette 10 is inserted into the cassette accommodation part 101, the drive shaft 105 is engaged with the input gear 22 and the platen gear 104 is engaged with the output gear 21.

Specifically, while the drive shaft 105 is inserted into the take-up spool 16 and the input gear 22 of the printing cassette 10, the platen gear 104 is engaged with the output gear 21 by pivotal movement of the platen roller 103 and the platen gear 104 toward the head opening 42B of the printing cassette 10.

With the printing cassette 10 in its attached state, the output gear 21 is rotated when the drive shaft 105 rotates the input gear 22. Further, the platen gear 104 is rotated by the rotation of the output gear 21, and the platen roller 103 is rotated by the rotation of the platen gear 104.

[1-2. Effects]

The following effects can be obtained according to the embodiment described above.

(1*a*) With the auxiliary tape cassette 40, any arbitrary printing tape 11A can be supplied into the auxiliary tape case 45 since the printing tape 11A supplied from an outside is guided to the second discharge opening 42C by the guide part 46.

As a result, any ink ribbon 14A and printing tape 11A can be arbitrarily combined. Further, by providing the auxiliary tape case 45 that accommodates therein the ink ribbon 14A and the drive transmission unit 20, the output gear 21 can be positioned relative to the printing device body 100 with greater accuracy.

(1*b*) The insertion opening 45F of the guide part 46 allows the printing tape 11A to be inserted into the auxiliary tape case 45. This configuration can both protect the printing tape 11A while ensuring stable conveyance of the printing tape 11A.

(1*c*) By arranging the insertion opening 45F in the insertion side surface 45G of the auxiliary tape case 45, a part of the path for the printing tape 11A (i.e., the second guide surface 45A) can be provided on the outer side (i.e., on the side surface) of the auxiliary tape case 45. As a result, the printing tape 11A can be introduced into the auxiliary tape case 45 relatively easily while a size of the auxiliary tape cassette 40 can be reduced.

2. Second Embodiment

[2-1. Configuration]

Figure 6A:
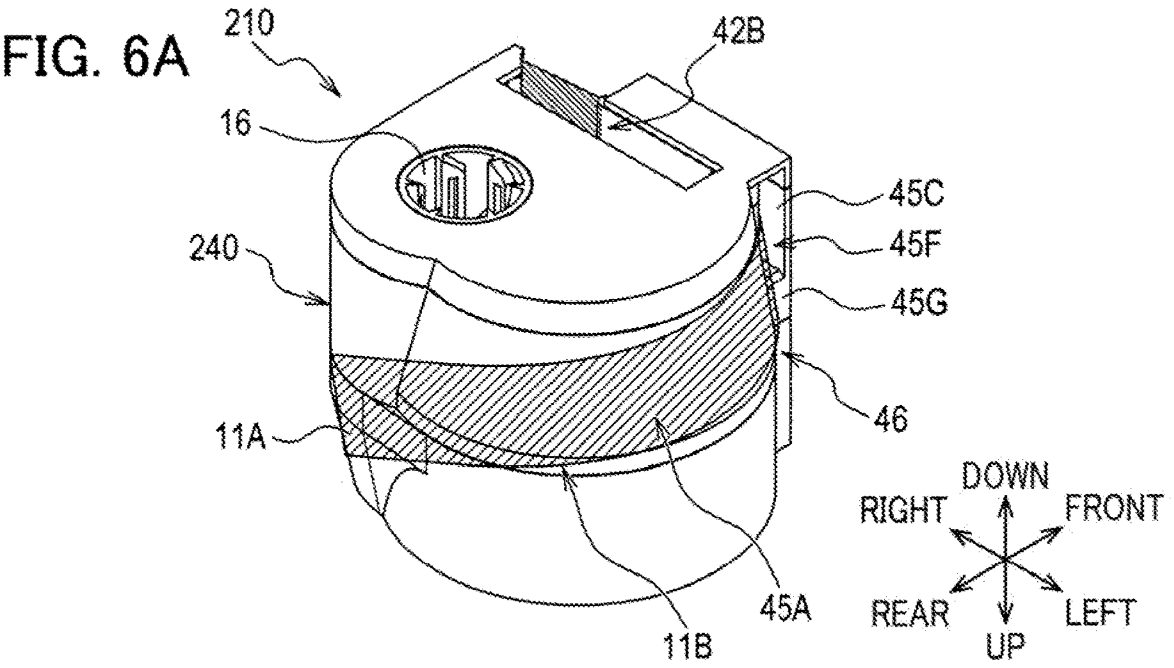
FIG. 6A is a schematic perspective view of a printing cassette.
Figure 6B:
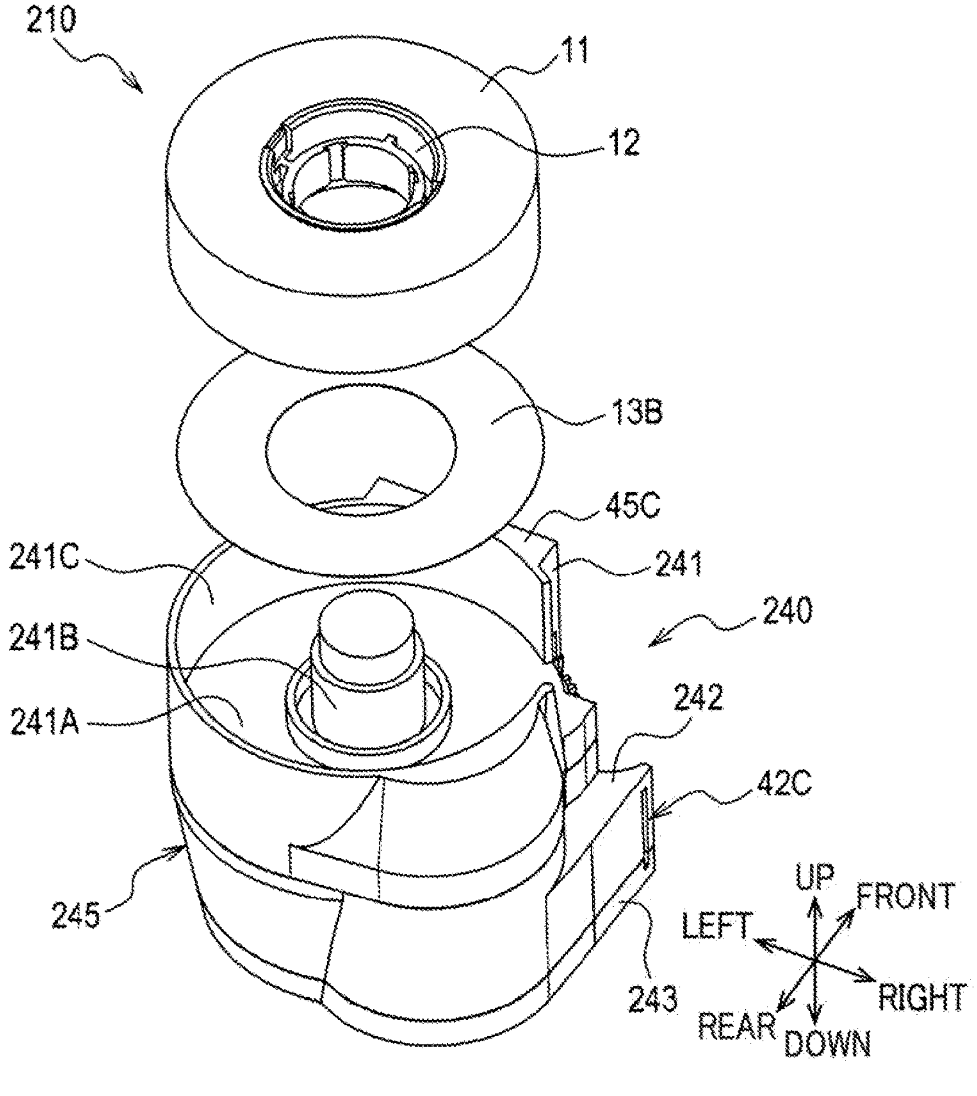
FIG. 6B is a schematic perspective view illustrating a state where a printing tape roll is detached from the printing cassette of FIG. 6A.

A printing cassette 210 illustrated in FIGS. 6A and 6B is attached to the printing device body 100 of FIG. 1 in place of the printing cassette 10 according to the first embodiment. The printing cassette 210 includes the printing tape roll 11, the first supply spool 12, and an auxiliary tape cassette 240.

(Auxiliary Tape Cassette)

The auxiliary tape cassette 240 includes an auxiliary tape case 245 that accommodates therein the ink ribbon roll 14, the drive transmission unit 20, and the like the same as those in the first embodiment.

The auxiliary tape case 245 includes a third case part 241, a fourth case part 242, and a fifth case part 243. The fourth case part 242 and the fifth case part 243 are identical to the respective fourth case part 42 and the fifth case part 43 in the first embodiment.

Figure 7:
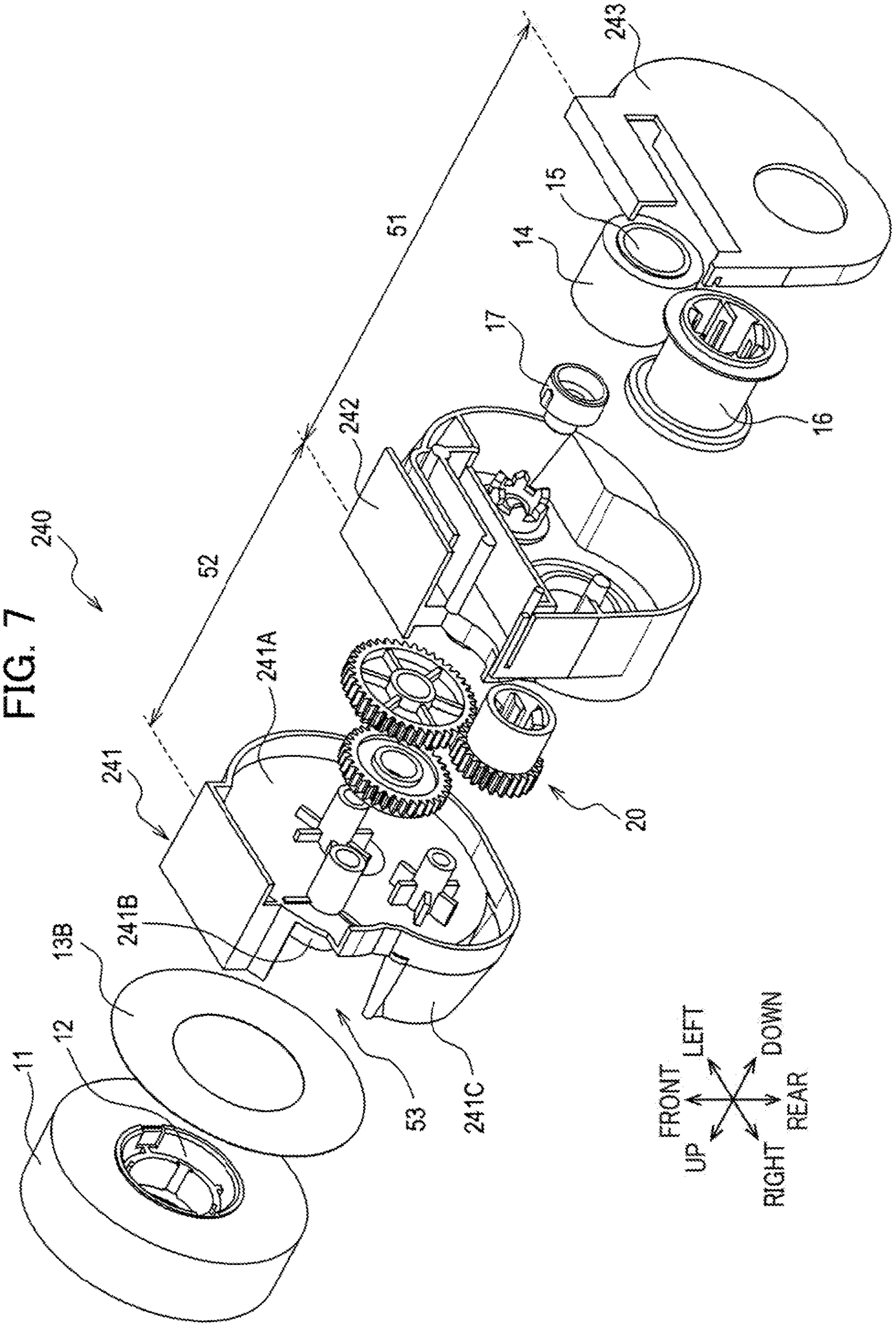
FIG. 7 is a schematic exploded perspective view of the printing cassette of FIG. 6A.

As illustrated in FIG. 7, the fourth case part 242 and the fifth case part 243 constitute an auxiliary tape accommodation part 51 that accommodates therein the ink ribbon roll 14. The third case part 241 and the fourth case part 242 constitute a gear accommodation part 52 that accommodates therein the drive transmission unit 20.

The third case part 241 supports the printing tape roll 11. The third case part 241 includes a partitioning wall 241A, a shaft part 241B, and a side wall 241C. The partitioning wall 241A covers the drive transmission unit 20 from above. The partitioning wall 241A extends in the front-rear direction and the left-right direction.

The shaft part 241B is a columnar or cylindrical part that protrudes upward from an upper surface of the partitioning wall 241A. The shaft part 241B can support the printing tape roll 11. The shaft part 241B is inserted into hollow parts of the printing tape roll 11 and the first supply spool 12.

The side wall 241C protrudes upward from an edge of the partitioning wall 241A. The side wall 241C is arranged to surround at least a part of the shaft part 241B from outward in a radial direction thereof. The printing tape roll 11 is inserted between the shaft part 241B and the side wall 241C. That is, the side wall 241C constitutes a printing tape accommodation part 53 that can accommodate therein the printing tape roll 11.

Note that the printing tape accommodation part 53 may have a cover that, in cooperation with the partitioning wall 241A, interposes the printing tape roll 11 therebetween in the up-down direction. The cover is configured to be movable between an open position in which the printing tape roll 11 can be placed in the printing tape accommodation part 53, and a closed position in which detachment of the printing tape roll 11 is prevented.

The printing tape accommodation part 53, the gear accommodation part 52, and the auxiliary tape accommodation part 51 are arranged in the up-down direction in the order of the printing tape accommodation part 53, the gear accommodation part 52, and the auxiliary tape accommodation part 51.

[2-2. Effects]

The following effects can be obtained according to the embodiment described above.

(2a) By virtue of each of the shaft part 241B and the auxiliary tape accommodation part 51, the printing tape roll 11 can be attached to the auxiliary tape cassette 240 while the printing tape roll 11 is positioned relative to the auxiliary tape cassette 240.

(2b) Since the gear accommodation part 52 is arranged between the printing tape accommodation part 53 and the auxiliary tape accommodation part 51 in the up-down direction, positioning accuracy of the output gear 21 relative to the printing device body 100 can be improved.

3. Third Embodiment

[3-1. Configuration]

Figure 8B:
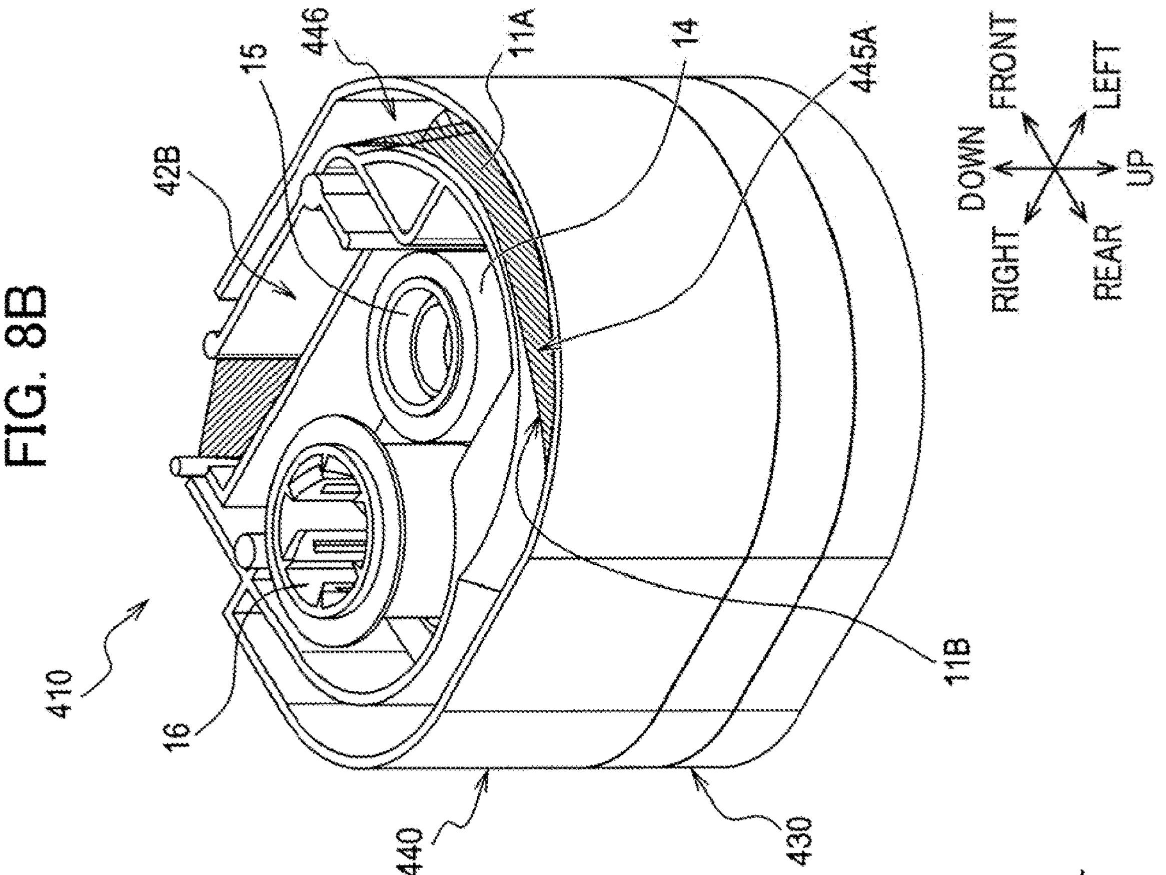
FIGS. 8A and 8B are schematic perspective views of a printing cassette.
Figure 8A:
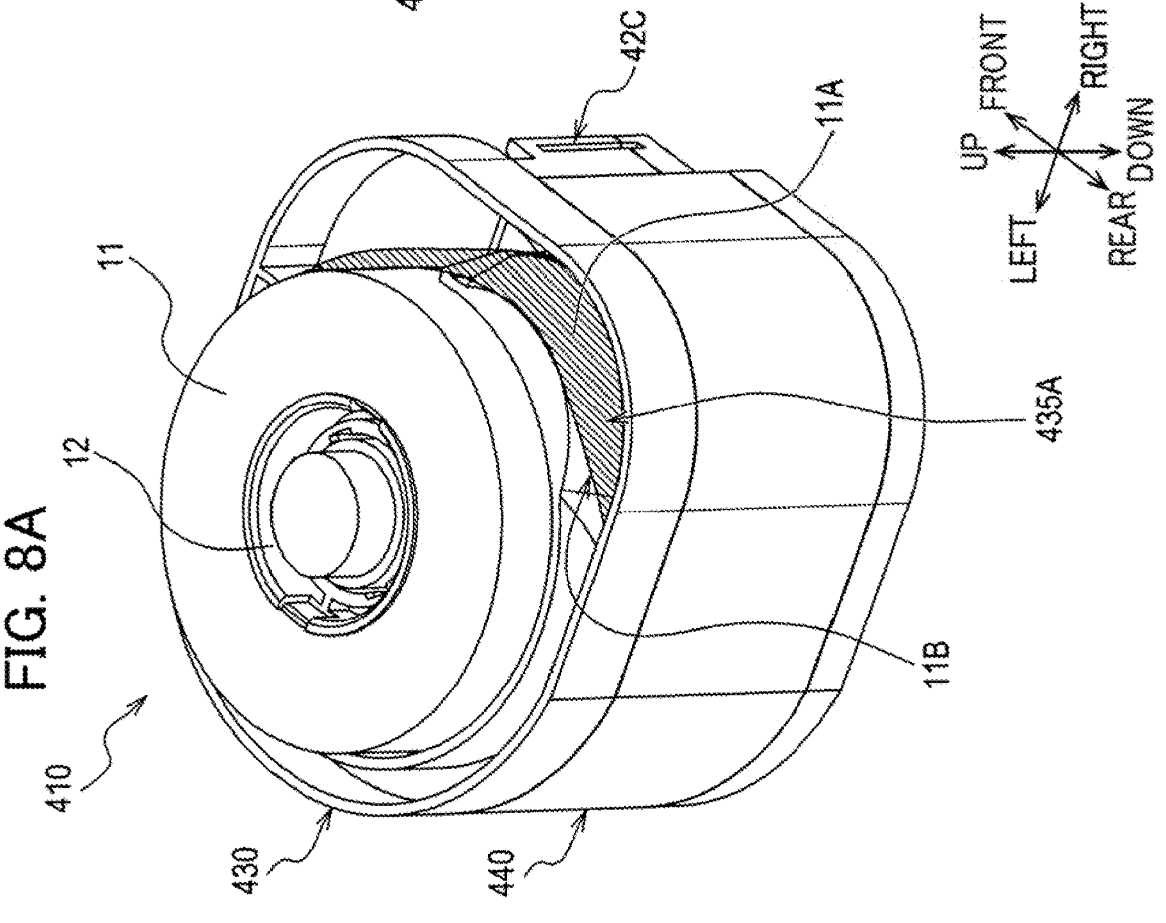

A printing cassette 410 illustrated in FIGS. 8A and 8B is attached to the printing device body 100 of FIG. 1 in place of the printing cassette 10 according to the first embodiment. The printing cassette 410 includes a printing tape cassette 430, and an auxiliary tape cassette 440.

Note that FIG. 8A illustrates a state in which a first case part 431 of the printing tape cassette 430 has been removed. FIG. 8B illustrates a state in which a third case part 441 of the auxiliary tape cassette 440 has been removed.

(Printing Tape Cassette)

Figure 9A:
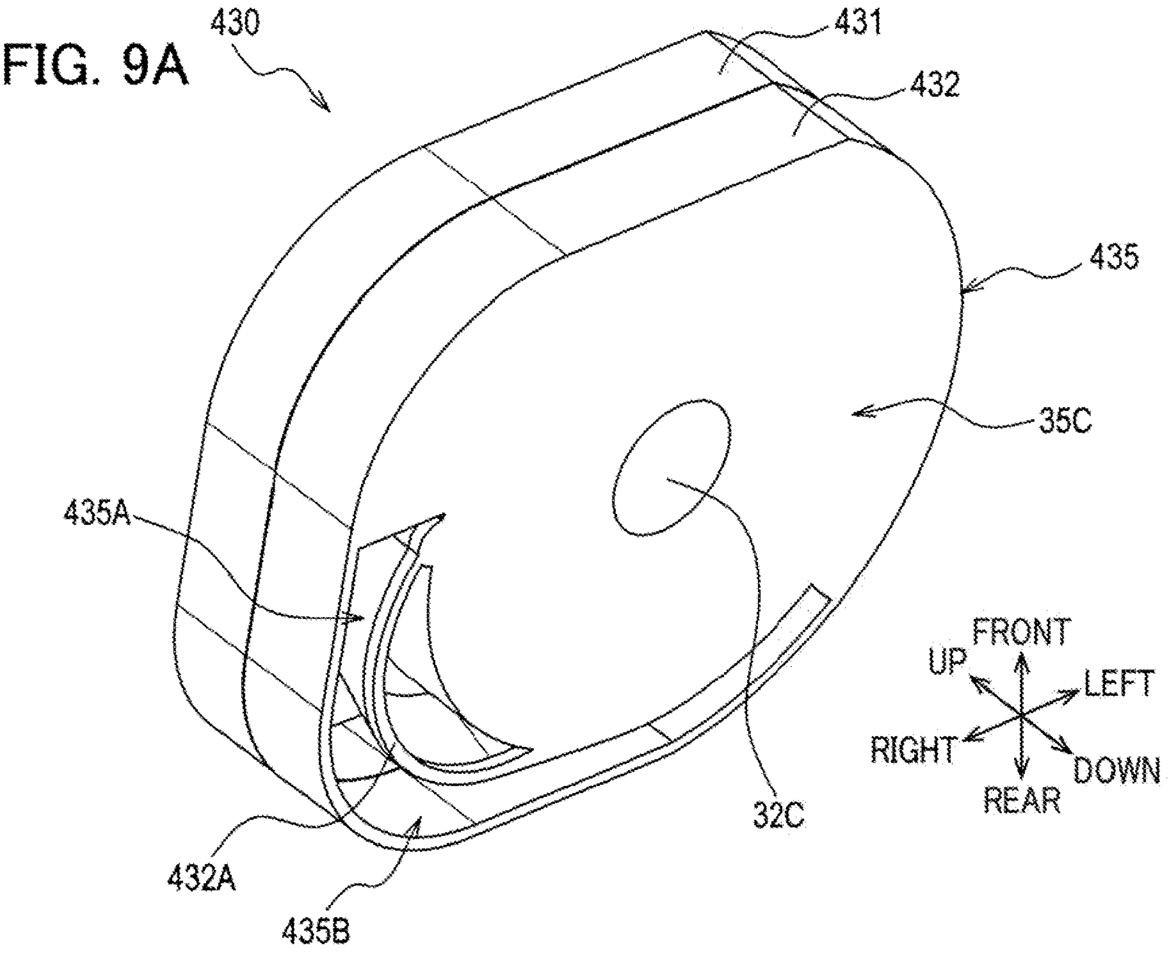
FIGS. 9A and 9B are schematic perspective views of a printing tape cassette of FIG. 8A.
Figure 9B:
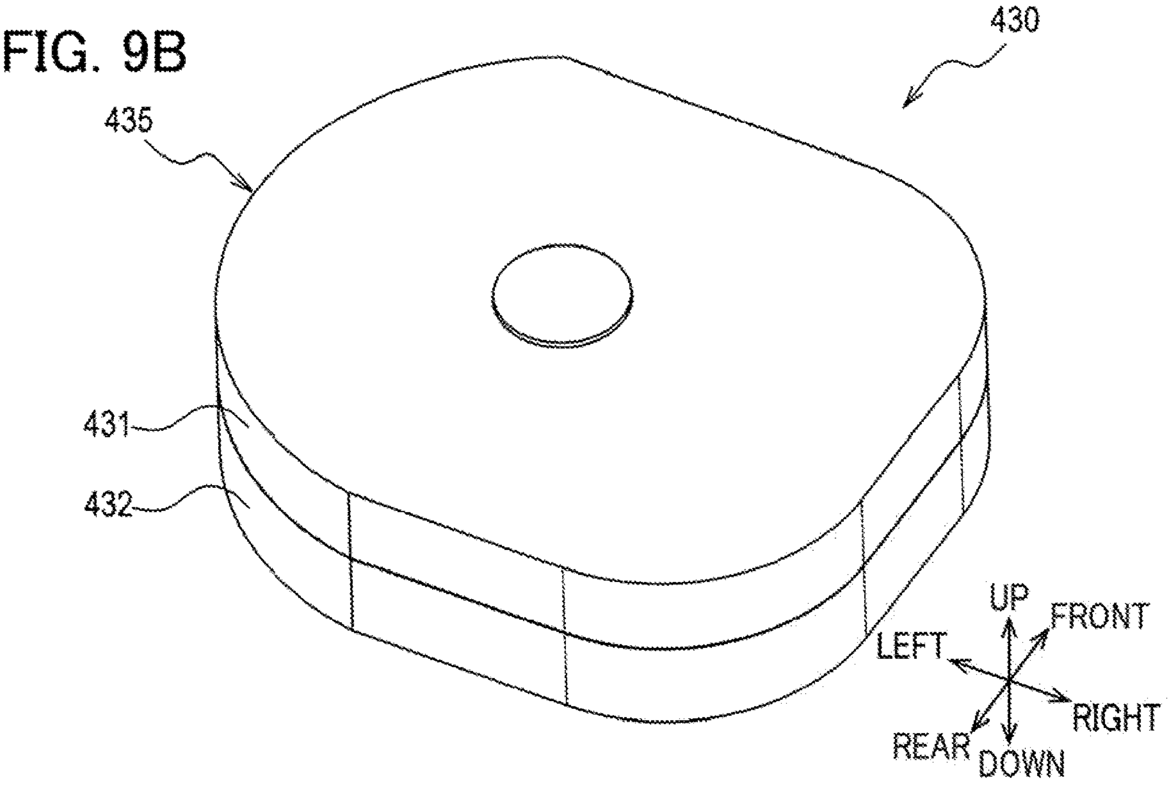

The printing tape cassette 430 illustrated in FIGS. 9A and 9B has a printing tape case 435 that accommodates therein the printing tape 11A. Parts accommodated in the printing tape case 435 are the same as those in the printing cassette 10 of the first embodiment.

The printing tape case 435 has the first case part 431, a second case part 432, a first guide surface 435A, and a first discharge opening 435B. The first case part 431 constitutes an upper end portion of the printing tape case 435. The second case part 432 is coupled to a lower portion the first case part 431 and constitutes a lower end portion of the printing tape case 435.

The second case part 432 has the first positioning part 32C provided on the first coupling surface 35C, similar to the first embodiment. Further, the second case part 432 has an inner wall 432A constituting the first guide surface 435A, and an opening constituting the first discharge opening 435B. The inner wall 432A surrounds the printing tape roll 11 from outward in a radial direction.

The first discharge opening 435B is provided in the first coupling surface 35C. The first discharge opening 435B discharges the printing tape 11A to an outside of the printing tape case 435 in a direction crossing the first coupling surface 35C (i.e., the up-down direction).

As illustrated in FIG. 8A, the first guide surface 435A guides the printing tape 11A drawn off the printing tape roll 11 toward the first discharge opening 435B. The printing tape 11A is wrapped around the first guide surface 435A from outward in the radial direction of the printing tape roll 11 while forming the spiral portion 11B.

(Auxiliary Tape Cassette)

Figure 10A:
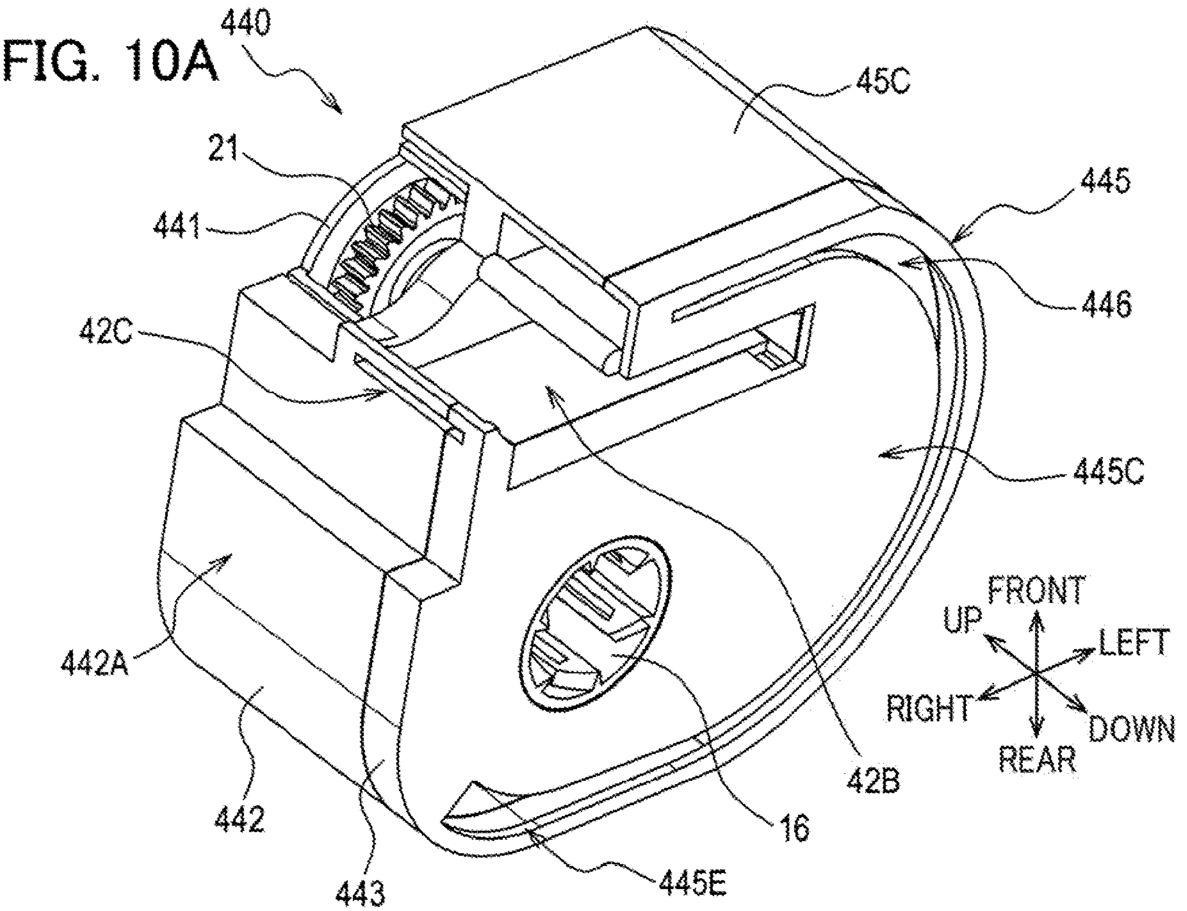
FIGS. 10A and 10B are schematic perspective views of an auxiliary tape cassette of FIG. 8A.
Figure 10B:
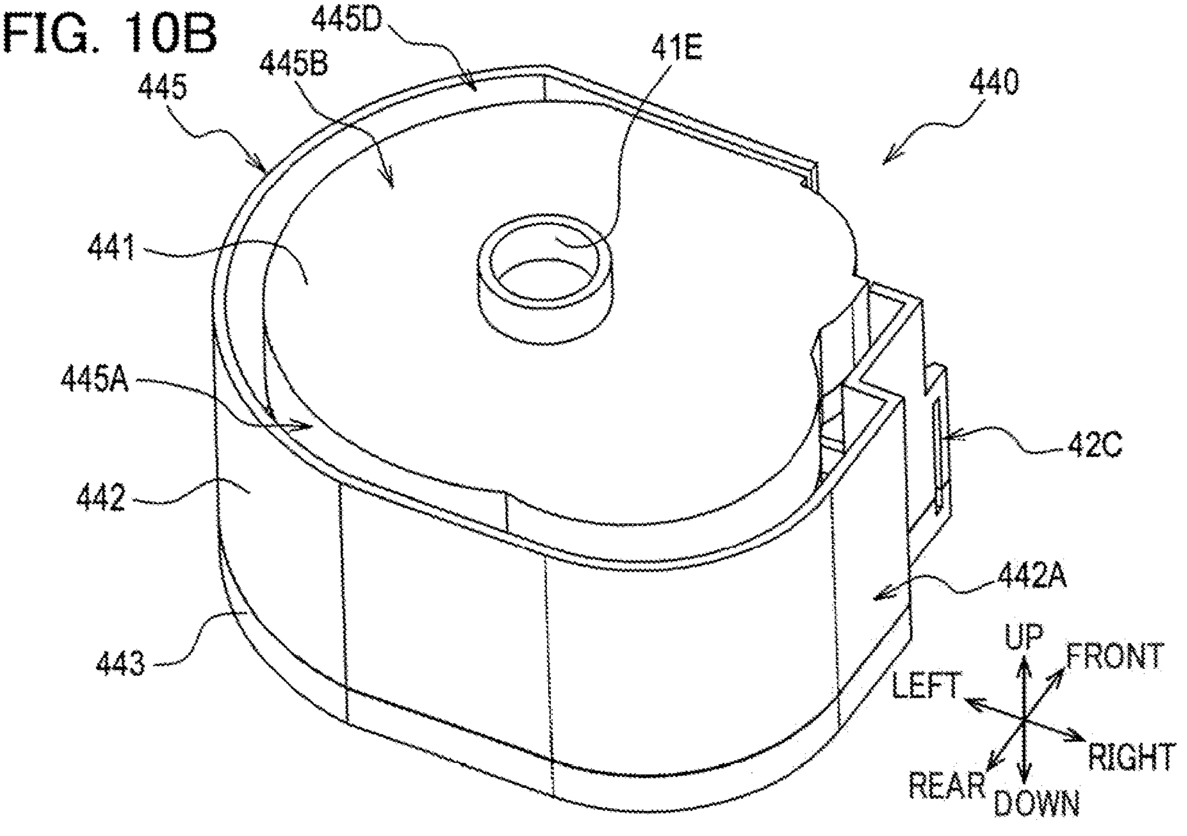

The auxiliary tape cassette 440 illustrated in FIGS. 10A and 10B has an auxiliary tape case 445 that accommodates therein the ink ribbon 14A and the drive transmission unit 20. Parts accommodated in the auxiliary tape case 445 are the same as those in the printing cassette 10 of the first embodiment.

The auxiliary tape case 445 has the third case part 441, a fourth case part 442, a fifth case part 443, a guide part 446, and a guide opening 445E.

Figure 11:
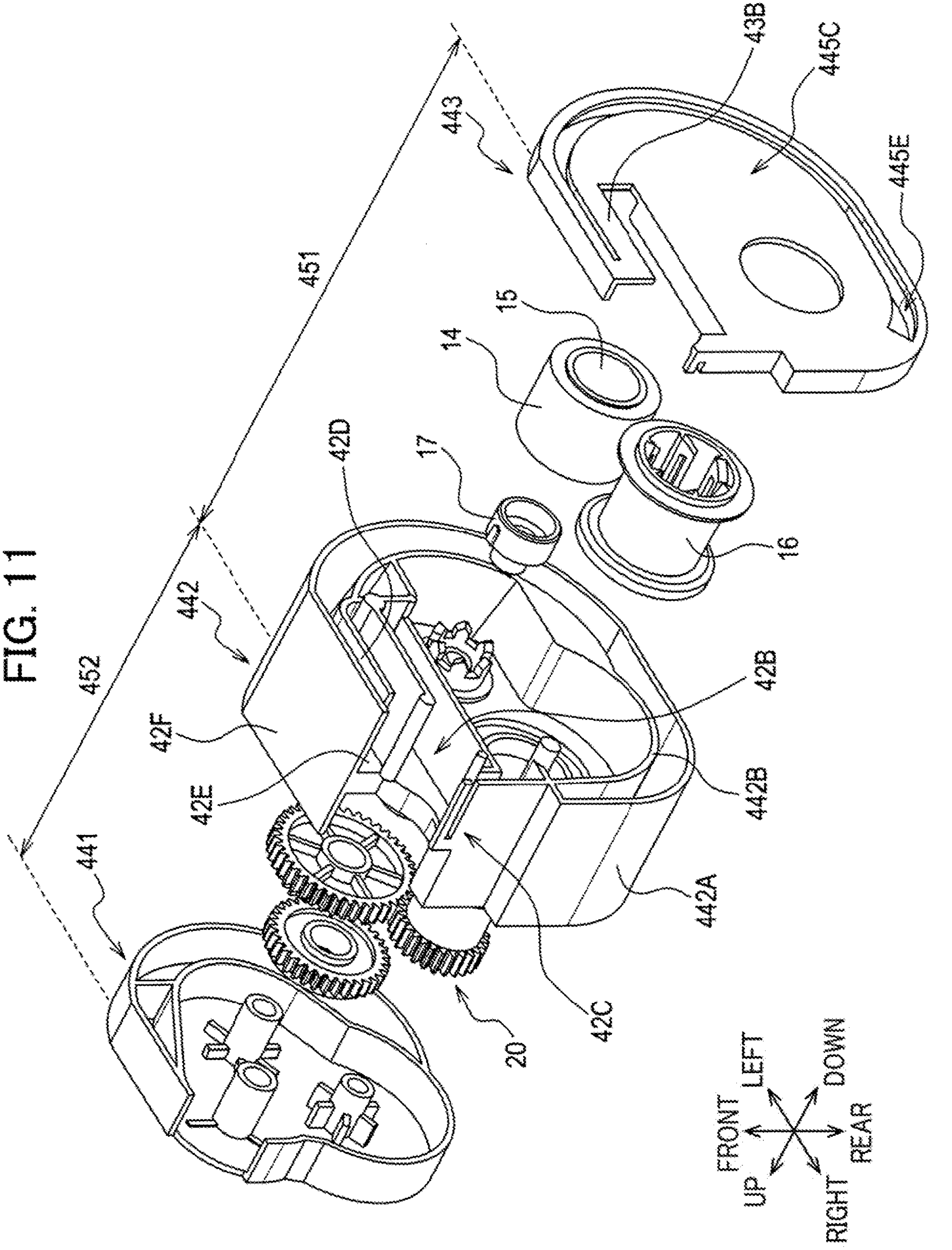
FIG. 11 is a schematic exploded perspective view of the auxiliary tape cassette of FIG. 10A.

As illustrated in FIG. 11, the fourth case part 442 and the fifth case part 443 constitute an auxiliary tape accommodation part 451 that accommodates therein the ink ribbon roll 14. The third case part 441 and the fourth case part 442 constitute a gear accommodation part 452 that accommodates therein the drive transmission unit 20. The gear accommodation part 452 is arranged to be overlapped with at least a part of the auxiliary tape accommodation part 451 in the up-down direction.

The third case part 441 constitutes an upper surface of the auxiliary tape case 445 (i.e., a second coupling surface 445B). The fifth case part 443 constitutes a lower end portion of the auxiliary tape case 445. The fourth case part 442 is coupled to an upper portion of the fifth case part 443.

As illustrated in FIG. 10B, the third case part 441 has the second positioning part 41E the same as that in the first embodiment. Also, the third case part 441 supports the drive transmission unit 20. The third case part 441 is fitted inside an outer wall 442A of the fourth case part 442 so as to close off an interior space of the fourth case part 442 from above.

The fourth case part 442 illustrated in FIG. 11 has the head opening 42B, the second discharge opening 42C, the inner guide wall 42D, the first restricting part 42E, and the ceiling wall 42F the same as those described in the first embodiment. The fourth case part 442 also has the outer wall 442A, and an inner wall 442B.

The inner wall 442B surrounds the ink ribbon roll 14, the second supply spool 15, and the take-up spool 16 from outward in a radial direction of the ink ribbon roll 14. A part of an outer surface of the inner wall 442B constitutes a second guide surface 445A.

The outer wall 442A surrounds the inner wall 442B from outward. As illustrated in FIG. 10B, an insertion opening 445D is formed at an upper end portion of the auxiliary tape case 445 by the third case part 441 and the fourth case part 442. The insertion opening 445D is in communication with a space between the outer wall 442A and the inner wall 442B.

The insertion opening 445D is provided in the second coupling surface 445B (an example of the first outer surface) that is coupled with the printing tape cassette 430. The second coupling surface 445B crosses the up-down direction (specifically, is orthogonal to the up-down direction) and is arranged to be offset from the ink ribbon roll 14 in the up-down direction (specifically, above the ink ribbon roll 14).

The insertion opening 445D is offset from the head opening 42B when viewed from the up-down direction. That is, the insertion opening 445D is not overlapped with the head opening 42B in the up-down direction. Further, the gear accommodation part 452 is arranged to be offset from the insertion opening 445D when viewed in the up-down direction. Accordingly, the printing tape 11A is inserted into the auxiliary tape accommodation part 451 after moving past an outside of the gear accommodation part 452.

The printing tape 11A that has been discharged through the first discharge opening 435B of the printing tape case 435 is conveyed into the auxiliary tape case 445 through the insertion opening 445D. As illustrated in FIG. 8B, the printing tape 11A that has been fed into the auxiliary tape case 445 is wrapped around the second guide surface 445A from outward in the radial direction of the ink ribbon roll 14 while forming the spiral portion 11B.

The guide part 446 guides the printing tape 11A supplied from the outside of the auxiliary tape case 445 toward the second discharge opening 42C. The guide part 446 includes the second guide surface 445A, and the insertion opening 445D.

The fifth case part 443 illustrated in FIG. 11 has the second restricting part 43B the same as that in the first embodiment. The fifth case part 443 also has an opening constituting the guide opening 445E. The guide opening 445E is provided in a bottom surface 445C (an example of the second outer surface). Together with the second coupling surface 445B, the bottom surface 445C interposes therebetween the ink ribbon roll 14 in the up-down direction in the auxiliary tape case 445.

The guide opening 445E is in communication with the space between the outer wall 442A and the inner wall 442B of the fourth case part 442. Further, at least a part of the guide opening 445E opposes the insertion opening 445D. Further, the guide opening 445E extends along the second guide surface 445A to a position overlapped with the arm part 45C (i.e., the inner guide wall 42D) so as to be overlapped with the conveying path of the printing tape 11A in the fourth case part 442 in the up-down direction.

Therefore, the printing tape 11A inserted into the auxiliary tape case 445 through the insertion opening 445D can be placed on the conveying path in the auxiliary tape case 445 while being drawn downward inside the auxiliary tape case 445 through the guide opening 445E.

Note that the guide opening 445E is not overlapped with the entire ink ribbon roll 14 in the up-down direction. That is, the guide opening 445E is formed in a shape that does not allow the ink ribbon roll 14 to pass downward through the fifth case part 443 and fall out of the auxiliary tape case 445.

Modification of Third Embodiment

Figure 12:
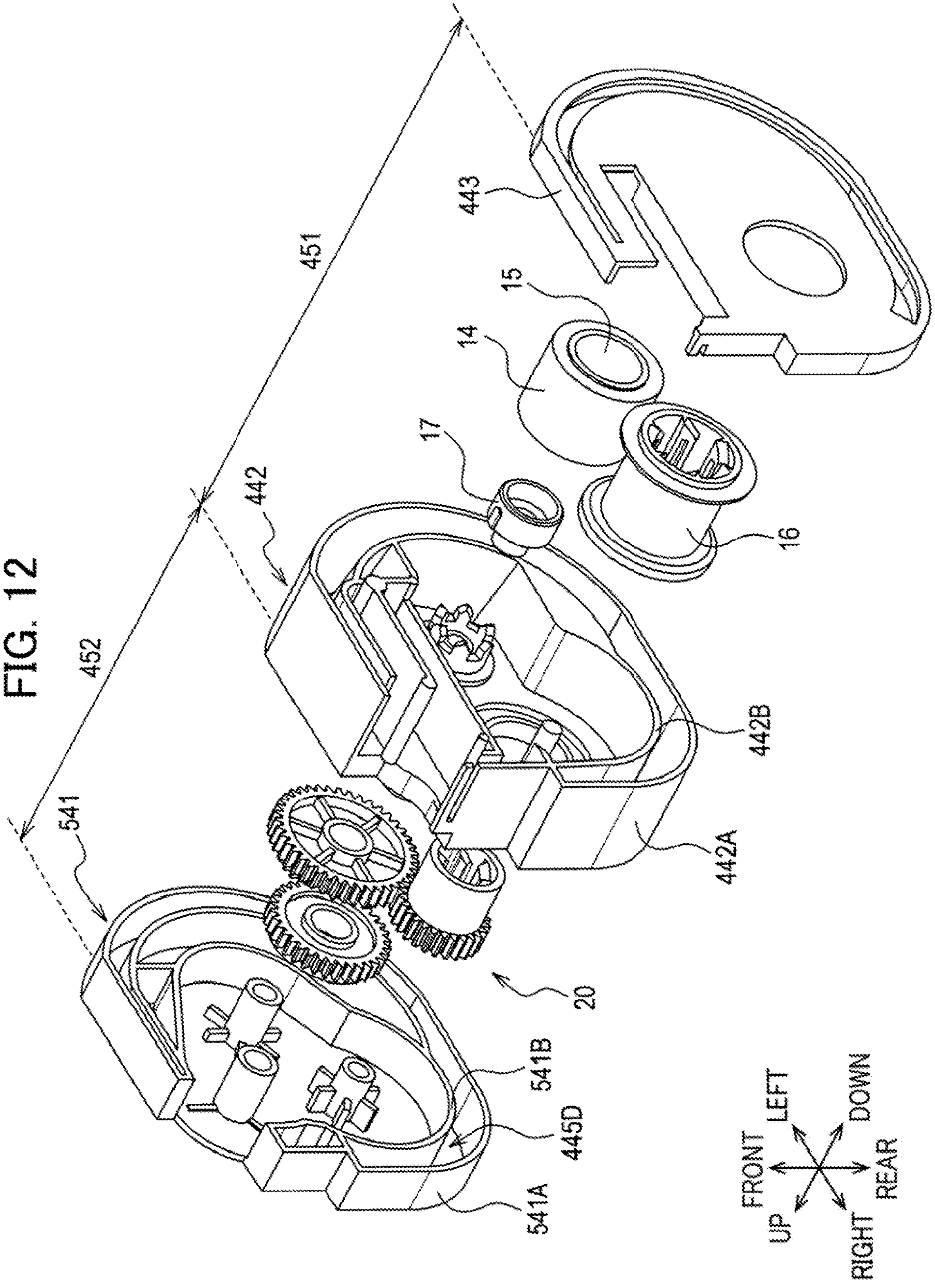
FIG. 12 is a schematic exploded perspective view of an auxiliary tape cassette.

The auxiliary tape case 445 in the present embodiment may have a third case part 541 illustrated in FIG. 12 in place of the third case part 441.

The third case part 541 has an outer wall 541A, and an inner wall 541B. The inner wall 541B surrounds the drive transmission unit 20 in directions orthogonal to the up-down direction. A part of an outer surface of the inner wall 541B constitutes the second guide surface 445A.

The outer wall 541A surrounds the inner wall 541B from outward. A space between the outer wall 541A and the inner wall 541B is in communication with the space between the outer wall 442A and the inner wall 442B of the fourth case part 442.

An upper end portion of the outer wall 541A and an upper end portion of the inner wall 541B constitute the insertion opening 445D provided in the second coupling surface 445B of the auxiliary tape case 445. In other words, the gear accommodation part 452 has the second coupling surface 445B and the insertion opening 445D.

Figure 13:
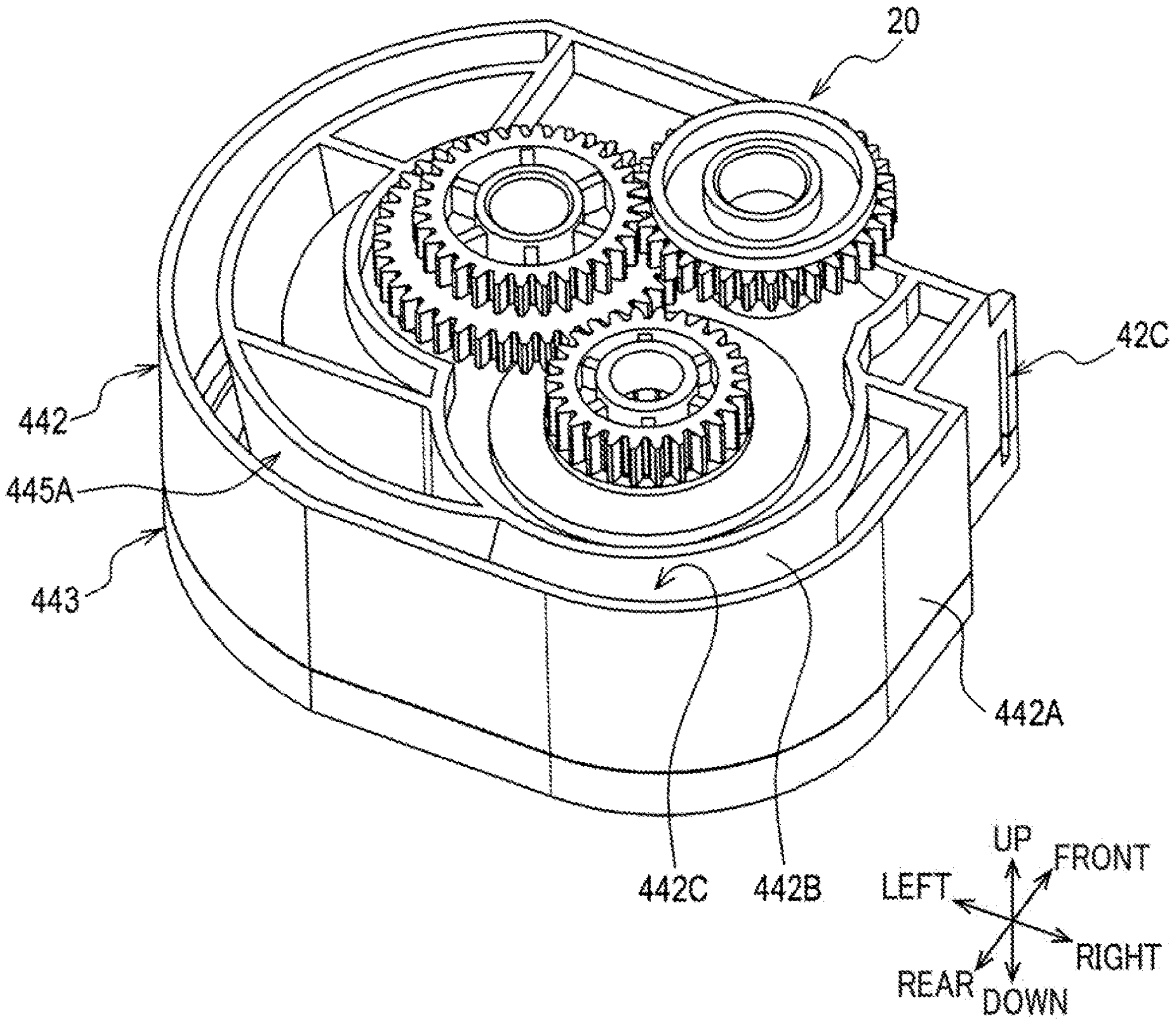
FIG. 13 is a schematic perspective view illustrating a state where a third case part is detached from the auxiliary tape cassette of FIG. 12.

As illustrated in FIG. 13, the auxiliary tape accommodation part 451 also has a communication opening 442C. The communication opening 442C is configured by an upper end portion of the outer wall 442A and an upper end portion of the inner wall 442B of the fourth case part 442.

The communication opening 442C provides communication between the gear accommodation part 452 and the auxiliary tape accommodation part 451. The printing tape 11A that has been inserted into the gear accommodation part 452 through the insertion opening 445D subsequently enters the auxiliary tape accommodation part 451 through the communication opening 442C.

[3-2. Effects]

The following effects can be obtained according to the embodiment described above.

(3*a*) By providing the insertion opening 445D in the second coupling surface 445B, the path for the printing tape 11A (the second guide surface 445A) is arranged inside the auxiliary tape cassette 440 when viewed along the up-down direction, thereby enabling the auxiliary tape cassette 440 to be made smaller.

(3*b*) By arranging the gear accommodation part 452 to be offset from the auxiliary tape accommodation part 451 when viewed in the up-down direction or providing the communication opening 442C in the auxiliary tape accommodation part 451, the printing tape 11A can be guided across the gear accommodation part 452 to the second discharge opening 42C.

(3*c*) The guide opening 445E enables the printing tape 11A to be placed on the guide part 446 in the auxiliary tape case 445 while being pulled out of the printing tape cassette 430.

4. Other Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(4*a*) The printing device in the above embodiments is not limited to a device that performs printing using an ink ribbon. In place of the printing tape, the printing device may use a strip of heat-sensitive paper. In this case, the auxiliary tape may be a laminated tape, for example.

(4*b*) In the auxiliary tape cassette of the embodiments described above, the guide part need not have an insertion opening. That is, the guide part may guide the printing tape using only the outer surface of the auxiliary tape case.

(4*c*) The auxiliary tape cassette of the third embodiment may include a shaft part and an auxiliary tape accommodation part those identical to the auxiliary tape cassette of the second embodiment. Further, one of the shaft part and the auxiliary tape accommodation part may be omitted from the auxiliary tape cassette of the second embodiment.

(4*d*) Functions possessed by a single component in the embodiments described above may be distributed among a plurality of components, and functions possessed by a plurality of components may be integrated into a single component. Additionally, a part of the structures in the embodiments described above may be omitted. Further, at least a part of the structures in the embodiments described above may be added to or used in place of structures in other embodiments. All aspects included in the technical concepts identified from descriptions in the claims are embodiments of the present disclosure.

What is claimed is:

1. An auxiliary tape cassette comprising:
an auxiliary tape used for printing on a printing tape;
a gear that transmits a driving force from an outside; and
a case that accommodates therein at least a part of the auxiliary tape and at least a part of the gear,
wherein the case has:
a discharge opening that discharges the printing tape to an outside; and
a guide part that guides the printing tape supplied from an outside of the case toward the discharge opening.

2. The auxiliary tape cassette according to claim 1,
wherein the guide part has an insertion opening through which the printing tape is inserted to an inside of the case.

3. The auxiliary tape cassette according to claim 2,
wherein the case has a first outer surface crossing a first direction parallel to a winding axis of a first roll configured of the auxiliary tape, the first outer surface being arranged to be offset from the first roll in the first direction, and
wherein the insertion opening is provided in the first outer surface.

4. The auxiliary tape cassette according to claim 2,
wherein the case has a side surface, the side surface being not overlapped with a first roll configured of the auxiliary tape in a first direction parallel to a winding axis of the first roll, the side surface crossing a second direction that is orthogonal to the winding axis of the first roll, and
wherein the insertion opening is provided in the side surface.

5. The auxiliary tape cassette according to claim 3,
wherein the case has:
an auxiliary tape accommodation part that accommodates therein the first roll; and
a gear accommodation part that accommodates therein the gear, wherein the gear accommodation part is arranged to be overlapped with at least a part of the auxiliary tape accommodation part in the first direction, the gear accommodation part having the first outer surface in which the insertion opening is provided, and
wherein the auxiliary tape accommodation part has a communication opening that provides communication between the gear accommodation part and the auxiliary tape accommodation part.

6. The auxiliary tape cassette according to claim 3,
wherein the case has:
an auxiliary tape accommodation part that accommodates therein the first roll; and
a gear accommodation part that accommodates therein the gear, and
wherein the gear accommodation part is arranged to be overlapped with at least a part of the auxiliary tape accommodation part in the first direction, the gear accommodation part being arranged to be offset from the insertion opening when viewed from the first direction.

7. The auxiliary tape cassette according to claim 3,
wherein the case has:
a second outer surface that interposes the first roll in cooperation with the first outer surface therebetween; and
a guide opening provided in the second outer surface at a position opposing the insertion opening.

8. The auxiliary tape cassette according to claim 3,
wherein the case has an exposure opening in which the printing tape is exposed at a position upstream relative to the discharge opening in a discharging direction of the printing tape, and
wherein the insertion opening is arranged to be offset from the exposure opening when viewed from the first direction.

9. The auxiliary tape cassette according to claim 1,
wherein the case has a shaft part that can support a second roll configured of the printing tape.

10. The auxiliary tape cassette according to claim 1,
wherein the case has a printing tape accommodation part that can accommodate therein a printing tape roll configured of the printing tape.

11. The auxiliary tape cassette according to claim 10,
wherein the case has:
an auxiliary tape accommodation part that accommodates therein an auxiliary tape roll configured of the auxiliary tape; and
a gear accommodation part that accommodates therein the gear, and
wherein the printing tape accommodation part, the gear accommodation part, and the auxiliary tape accommodation part are arranged in an order of the printing tape accommodation part, the gear accommodation part, and the auxiliary tape accommodation part in a direction parallel to a winding axis of the auxiliary tape roll.

* * * * *